US011099138B2

(12) United States Patent
Hori et al.

(10) Patent No.: US 11,099,138 B2
(45) Date of Patent: Aug. 24, 2021

(54) DETECTION DEVICE

(71) Applicant: Mitsubishi Electric Corporation, Tokyo (JP)

(72) Inventors: Junji Hori, Tokyo (JP); Koji Sakata, Tokyo (JP); Takuya Hashiguchi, Tokyo (JP); Keita Mochizuki, Tokyo (JP); Kiyotaka Watanabe, Tokyo (JP); Hiroshi Sasai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 16/463,852

(22) PCT Filed: Feb. 6, 2017

(86) PCT No.: PCT/JP2017/004225
§ 371 (c)(1),
(2) Date: May 24, 2019

(87) PCT Pub. No.: WO2018/142613
PCT Pub. Date: Aug. 9, 2018

(65) Prior Publication Data
US 2019/0345648 A1 Nov. 14, 2019

(51) Int. Cl.
| | |
|---|---|
| *G01B 11/02* | (2006.01) |
| *G01N 21/892* | (2006.01) |
| *G01B 21/02* | (2006.01) |
| *G01N 21/952* | (2006.01) |
| *D01H 13/32* | (2006.01) |

(52) U.S. Cl.
CPC ............ *G01N 21/952* (2013.01); *D01H 13/32* (2013.01); *G01B 11/02* (2013.01); *G01B 21/02* (2013.01); *G01N 21/892* (2013.01)

(58) Field of Classification Search
CPC ........ G01B 11/02; G01B 21/02; G01B 11/24; G01N 21/892; G01N 21/952; D07B 1/145; D07B 2301/5572; D01H 13/32
See application file for complete search history.

(56) References Cited

FOREIGN PATENT DOCUMENTS

| WO | 2011/108173 A1 | 9/2011 |
|---|---|---|
| WO | 2016/157290 A1 | 10/2016 |

OTHER PUBLICATIONS

Office Action dated Oct. 10, 2020, in corresponding Chinese patent Application No. 201780084710.9, 22 pages.
(Continued)

*Primary Examiner* — Kara E. Geisel
*Assistant Examiner* — Amanda Merlino
(74) *Attorney, Agent, or Firm* — Xsensus LLP

(57) ABSTRACT

A phase calculation unit (12) calculates, as a first phase, a deflection angle of a first similarity vector having a first similarity and a second similarity calculated by a similarity calculation unit (11) as elements. The phase calculation unit (12) calculates, as a second phase, a deflection angle of a second similarity vector having a third similarity and a fourth similarity calculated by the similarity calculation unit (11) as elements. A period calculation unit (13) calculates a period of a pattern formed on a long body on the basis of the first phase and the second phase calculated by the phase calculation unit (12). An abnormality detection unit (14) detects an abnormality in the long body on the basis of the period calculated by the period calculation unit (13).

19 Claims, 20 Drawing Sheets

(56) References Cited

OTHER PUBLICATIONS

Office Action dated May 19, 2020 in Korean Patent Application No. 10-2019-7022529, 22 pages.
International Search Report dated Apr. 25, 2017 for PCT/JP2017/004225 filed on Feb. 6, 2017, 11 pages including English Translation of the International Search Report.

FIG. 3
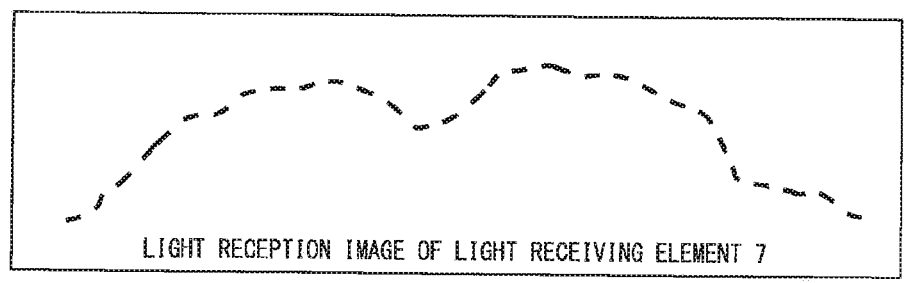
LIGHT RECEPTION IMAGE OF LIGHT RECEIVING ELEMENT 7
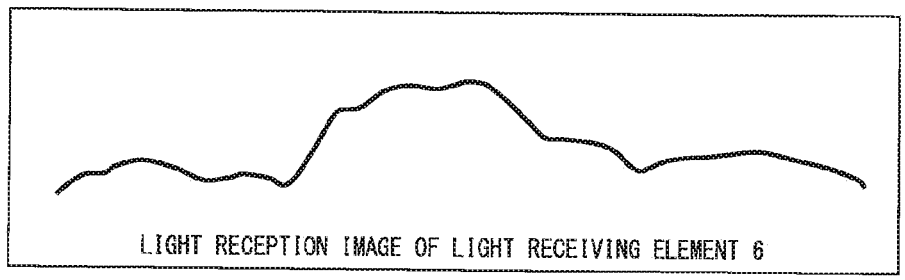
LIGHT RECEPTION IMAGE OF LIGHT RECEIVING ELEMENT 6
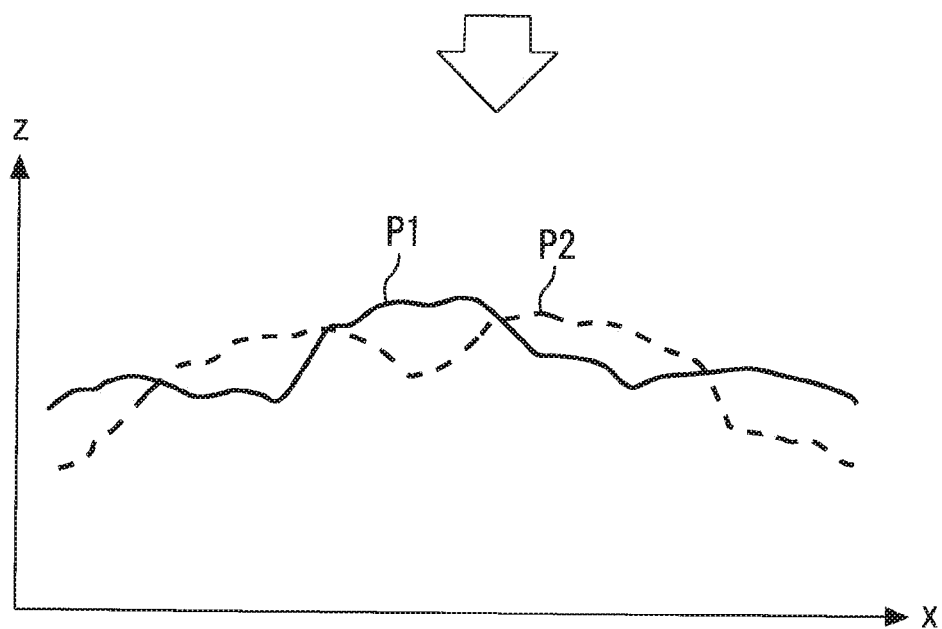

No. 3 : CONTROLLER
No. 9 : STORAGE UNIT
No. 10: DATA PROCESSING UNIT
No. 11: SIMILARITY CALCULATION UNIT
No. 12: PHASE CALCULATION UNIT
No. 13: PERIOD CALCULATION UNIT
No. 14: ABNORMALITY DETECTION UNIT
No. 15: SPEED CALCULATION UNIT
No. 16: POSITION CALCULATION UNIT
No. 17: DISABLING UNIT
No. 18: ABNORMALITY DETECTION UNIT

S101: ACQUIRE SURFACE DATA
S102: CALCULATE SIMILARITY
S103: CALCULATE PHASE
S104: CALCULATE PERIOD
S105: IS THERE ABNORMALITY?
S106: RAISE ALARM

FIG. 10
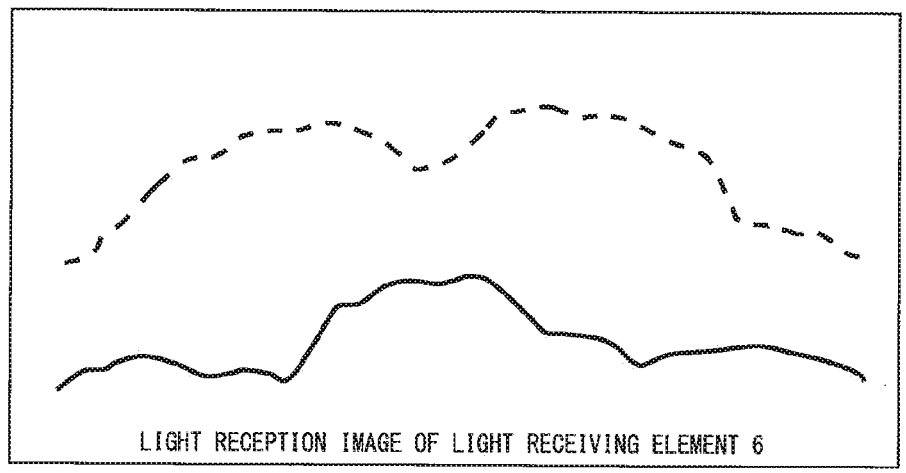
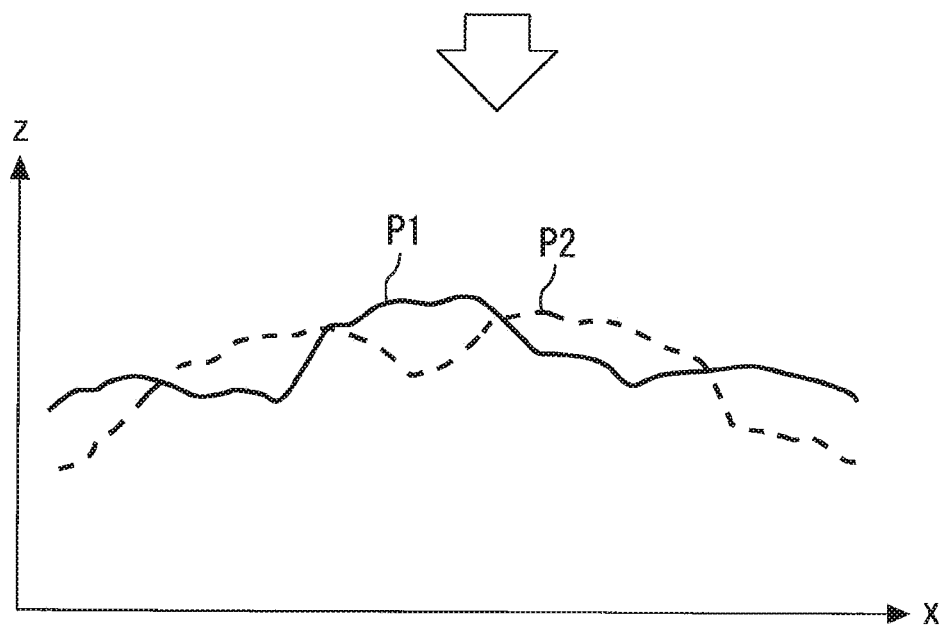

DETECTION DEVICE

CROSS-REFERENCE TO RELATED APPLICATION

The present application is based on PCT filing PCT/JP2017/004225, filed Feb. 6, 2017, which is incorporated herein by reference

FIELD

The present invention relates to a detection device for detecting a long body.

BACKGROUND

PTL 1 describes a device for checking a rope. The device described in PTL 1 includes a light source and a light receiving element. A rope is arranged between the light source and the light receiving element. In the device described in PTL 1, a diameter of the rope is calculated on the basis of a light amount received by the light receiving element. A position of the rope is calculated by matching intervals of peak values of the calculated diameter with intervals of strands.

CITATION LIST

Patent Literature

[PTL 1] WO 2011/108173 A1

SUMMARY

Technical Problem

When a movement speed of the rope fluctuates, the device described in PTL 1 is unable to distinguish between whether the movement speed of the rope is fluctuating and whether a strand pitch of the rope is fluctuating. In other words, with a detection method adopted by the device described in PTL 1, when the movement speed of the rope fluctuates, an abnormality having occurred in the rope such as a pitch abnormality cannot be detected.

The present invention is made in order to solve problems such as that described above. An object of the present invention is to provide a detection device capable of detecting an abnormality in a long body even when a movement speed of the long body fluctuates.

Solution to Problem

A detection device of the present invention comprises data acquisition means configured to acquire first surface data and second surface data of a long body having a periodic pattern on a surface thereof, storage means configured to store first reference data and second reference data, similarity calculation means configured to calculate a first similarity between the first surface data acquired by the data acquisition means and the first reference data, a second similarity between the first surface data acquired by the data acquisition means and the second reference data, a third similarity between the second surface data acquired by the data acquisition means and the first reference data, and a fourth similarity between the second surface data acquired by the data acquisition means and the second reference data, phase calculation means configured to calculate, as a first phase, a deflection angle of a first similarity vector having the first similarity and the second similarity calculated by the similarity calculation means as elements and, as a second phase, a deflection angle of a second similarity vector having the third similarity and the fourth similarity calculated by the similarity calculation means as elements, period calculation means configured to calculate a period of the pattern formed on the long body on the basis of the first phase and the second phase calculated by the phase calculation means, and first abnormality detection means configured to detect an abnormality in the long body on the basis of the period calculated by the period calculation means.

A detection device of the present invention comprises data acquisition means configured to acquire a plurality of pieces of surface data of a long body having a periodic pattern on a surface thereof, storage means configured to store first reference data and second reference data, selection means configured to select first surface data and second surface data from the pieces of surface data acquired by the data acquisition means, similarity calculation means configured to calculate a first similarity between the first surface data selected by the selection means and the first reference data, a second similarity between the first surface data selected by the selection means and the second reference data, a third similarity between the second surface data selected by the selection means and the first reference data, and a fourth similarity between the second surface data selected by the selection means and the second reference data, phase calculation means configured to calculate, as a first phase, a deflection angle of a first similarity vector having the first similarity and the second similarity calculated by the similarity calculation means as elements and, as a second phase, a deflection angle of a second similarity vector having the third similarity and the fourth similarity calculated by the similarity calculation means as elements, period calculation means configured to calculate a period of the pattern formed on the long body on the basis of the first phase and the second phase calculated by the phase calculation means, and first abnormality detection means configured to detect an abnormality in the long body on the basis of the period calculated by the period calculation means.

A detection device of the present invention comprises data acquisition means configured to acquire first surface data of a first long body having a periodic pattern on a surface thereof and second surface data of a second long body having, on a surface thereof, a same pattern as the pattern formed on the surface of the first long body, storage means configured to store first reference data and second reference data, similarity calculation means configured to calculate a first similarity between the first surface data acquired by the data acquisition means and the first reference data, a second similarity between the first surface data acquired by the data acquisition means and the second reference data, a third similarity between the second surface data acquired by the data acquisition means and the first reference data, and a fourth similarity between the second surface data acquired by the data acquisition means and the second reference data, phase calculation means configured to calculate, as a first phase, a deflection angle of a first similarity vector having the first similarity and the second similarity calculated by the similarity calculation means as elements and, as a second phase, a deflection angle of a second similarity vector having the third similarity and the fourth similarity calculated by the similarity calculation means as elements, and first abnormality detection means configured to detect that an abnormality has occurred in the first long body or the second long body on the basis of the first phase and the second phase calculated by the phase calculation means.

Advantageous Effects of Invention

For example, a detection device according to the present invention includes similarity calculation means, phase calculation means, period calculation means, and first abnormality detection means. The phase calculation means calculates a deflection angle of a first similarity vector as a first phase and calculates a deflection angle of a second similarity vector as a second phase. The period calculation means calculates a period of a pattern formed on a long body on the basis of the first phase and the second phase calculated by the phase calculation means. The first abnormality detection means detects an abnormality in the long body on the basis of the period calculated by the period calculation means. With the detection device according to the present invention, an abnormality in a long body can be detected even when a movement speed of the long body fluctuates.

BRIEF DESCRIPTION OF DRAWINGS

FIG. 3 is a diagram showing a processing method of light reception images acquired by light receiving elements.

FIG. 10 is a diagram showing a processing method of a light reception image acquired by a light receiving element.

DESCRIPTION OF EMBODIMENTS

Figure 1:
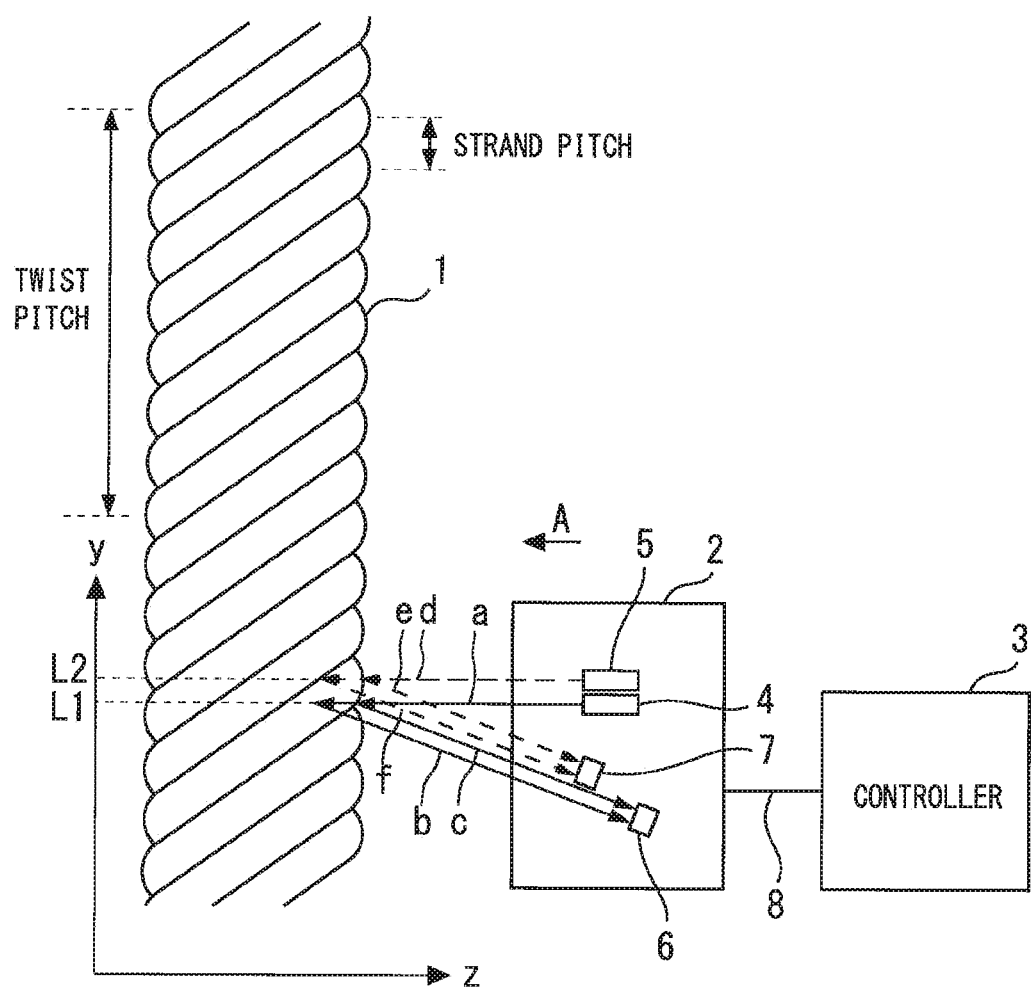
FIG. 1 is a diagram showing an example of a detection device according to a first embodiment of the present invention.

The present invention will be described with reference to the accompanying drawings. Redundant descriptions will be simplified or omitted as appropriate. In the respective drawings, the same reference numerals indicate the same or corresponding portions.

First Embodiment

Figure 2:
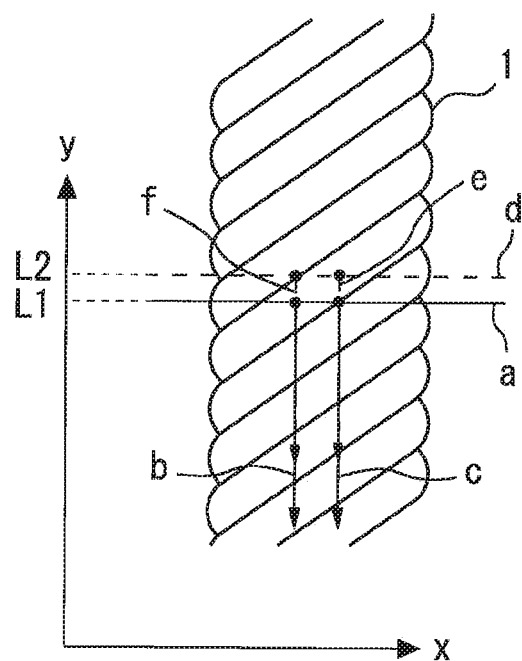
FIG. 2 is a diagram viewing a long body from a direction of an arrow A shown in FIG. 1.

FIG. 1 is a diagram showing an example of a detection device according to the first embodiment of the present invention. The detection device is a device for detecting an abnormality in a long body. Examples of the long body include a rope 1. FIG. 2 is a diagram viewing the long body from a direction of an arrow A shown in FIG. 1.

In order to simplify descriptions, an x axis, a y axis, and a z axis are configured as shown in FIGS. 1 and 2. The y axis is an axis oriented in a longitudinal direction of the long body. The x axis is orthogonal to the y axis and the z axis. The z axis is orthogonal to the y axis and the x axis. The x axis, the y axis, and the z axis are configured so as to represent coordinates in a three-dimensional space. FIG. 2 corresponds to a diagram in which the long body is viewed from a +z direction.

The long body moves in the longitudinal direction. For example, the rope 1 moves in a +y direction or a −y direction. An example of the rope 1 which moves in this manner is a wire rope used in an elevator. The rope 1 may move in both the +y direction and the −y direction. It should be noted that the long body that is a detection object of the detection device is not limited to the rope 1.

The rope 1 includes a plurality of strands. The rope 1 is formed by twisting a plurality of strands together. Therefore, the rope 1 has a periodic pattern on a surface thereof. An object of which an abnormality is detected by the present detection device is a long body having a periodic pattern on a surface thereof. For example, "patterns" include shapes, graphics, colors, and gradations of colors. FIGS. 1 and 2 show an example in which the rope 1 is formed by twisting eight strands together. Irregularities formed by twisting the plurality of strands together are regularly arranged on the surface of the rope 1. An ideal rope 1 has a sectional shape that is the same at every distance obtained by dividing a twist pitch by the number of strands. The section described above is a section in a direction orthogonal to the longitudinal direction of the rope 1. The distance obtained by dividing the twist pitch by the number of strands is a strand pitch or, in other words, a period of the pattern.

In the example described in the present embodiment, the detection device calculates the period of the pattern formed on the long body and determines a presence or absence of an abnormality. For example, the detection device includes a sensor head 2 and a controller 3.

The sensor head 2 is an example of means which acquires surface data of the long body. "Surface data" refers to data related to the pattern on the surface of the long body. In the example described in the present embodiment, the sensor head 2 simultaneously acquires surface data of two locations of the long body. For example, the sensor head 2 acquires data representing irregularities formed on a surface of a portion passing a first position in the rope 1 as first surface data. At the same time, the sensor head 2 acquires data representing irregularities formed on a surface of a portion passing a second position in the rope 1 as second surface data. The second position is a position that differs from the first position. For example, the second position is a position at a certain distance in the y axis direction from the first position. FIG. 1 shows an example in which the sensor head 2 is an optical profile measuring instrument. For example, the sensor head 2 includes a light source 4, a light source 5, a light receiving element 6, and a light receiving element 7.

The light source 4 irradiates the surface of the rope 1 with light. FIGS. 1 and 2 show an example in which the light source 4 irradiates a laser beam in a direction orthogonal to the longitudinal direction of the rope 1. The light irradiated from the light source 4 strikes the surface of the portion passing the first position in the rope 1. In the example shown in FIGS. 1 and 2, the light irradiated from the light source 4 strikes linearly from an end on one side to an end on another side of the rope 1 so as to traverse the rope 1.

The light source 5 irradiates the surface of the rope 1 with light. The light source 5 irradiates light in parallel to the light irradiated from the light source 4. A timing at which the light source 5 irradiates light is the same as a timing at which the light source 4 irradiates light. FIGS. 1 and 2 show an example in which the light source 5 irradiates a laser beam in a direction orthogonal to the longitudinal direction of the rope 1. The light irradiated from the light source 5 strikes the surface of the portion passing the second position in the rope 1. In other words, the light irradiated from the light source 5 strikes the rope 1 at a position separated by a certain distance in the y axis direction from the position where the light from the light source 4 strikes the rope 1. In the example shown in FIGS. 1 and 2, the light irradiated from the light source 5 strikes linearly from an end on one side to an end on another side of the rope 1 so as to traverse the rope 1.

The light receiving element 6 receives light reflected by the surface of the rope 1 among the light irradiated from the light source 4. The light receiving element 6 is arranged obliquely with respect to the direction in which the light source 4 irradiates light. The light receiving element 6 receives light obliquely reflected at a certain angle with respect to the longitudinal direction of the rope 1 among the light from the light source 4 reflected by the surface of the rope 1.

The light receiving element 7 receives light reflected by the surface of the rope 1 among the light irradiated from the light source 5. The light receiving element 7 is arranged obliquely with respect to the direction in which the light source 5 irradiates light. The light receiving element 7 receives light obliquely reflected at a certain angle with respect to the longitudinal direction of the rope 1 among the light from the light source 5 reflected by the surface of the rope 1. For example, the light receiving element 7 receives light reflected on the surface of the rope 1 at a same angle as the light received by the light receiving element 6.

Light a shown in FIGS. 1 and 2 is light irradiated toward the rope 1 from the light source 4. For example, the light a strikes the surface of the rope 1 at y=L1. Light b and light c are light reflected at an angle at which light is received by the light receiving element 6 among the light a reflected by the surface of the rope 1. The light b is light reflected by an outermost bulging portion of a strand. The light c is light reflected by a groove portion formed by adjacent strands. When the light receiving element 6 receives the light b, the light c, and the like, the sensor head 2 acquires data representing a sectional shape of the portion struck by the light from the light source 4 as first surface data.

Light d shown in FIGS. 1 and 2 is light irradiated toward the rope 1 from the light source 5. For example, the light d strikes the surface of the rope 1 at y=L2. Light e and light f are light reflected at an angle at which light is received by the light receiving element 7 among the light d reflected by the surface of the rope 1. The light e is light reflected by an outermost bulging portion of a strand. The light f is light reflected by a groove portion formed by adjacent strands. When the light receiving element 7 receives the light e, the light f, and the like, the sensor head 2 acquires data representing a sectional shape of the portion struck by the light from the light source 5 as second surface data.

FIG. 3 is a diagram showing a processing method of light reception images acquired by the light receiving element 6 and the light receiving element 7. An upper half of FIG. 3 shows a light reception image of the light receiving element 6 and a light reception image of the light receiving element 7. A lower half of FIG. 3 shows first surface data P1 converted from the light reception image of the light receiving element 6 and second surface data P2 converted from the light reception image of the light receiving element 7. An abscissa of the lower half of FIG. 3 shows that each of the first surface data P1 and the second surface data P2 includes a plurality of pieces of data in the x direction. The number of pieces of data included in surface data is arbitrarily determined.

In the example described in the present embodiment, the controller 3 detects a pitch abnormality having occurred in the rope 1 on the basis of the first surface data and the second surface data acquired by the sensor head 2. In other words, the controller 3 detects a period abnormality in a pattern formed on the surface of the long body. FIG. 1 shows an example in which the controller 3 is connected to the sensor head 2 by a signal line 8. The sensor head 2 and the controller 3 may be placed inside a same chassis. A part of functions included in the controller 3 may be included in the sensor head 2.

Figure 4:
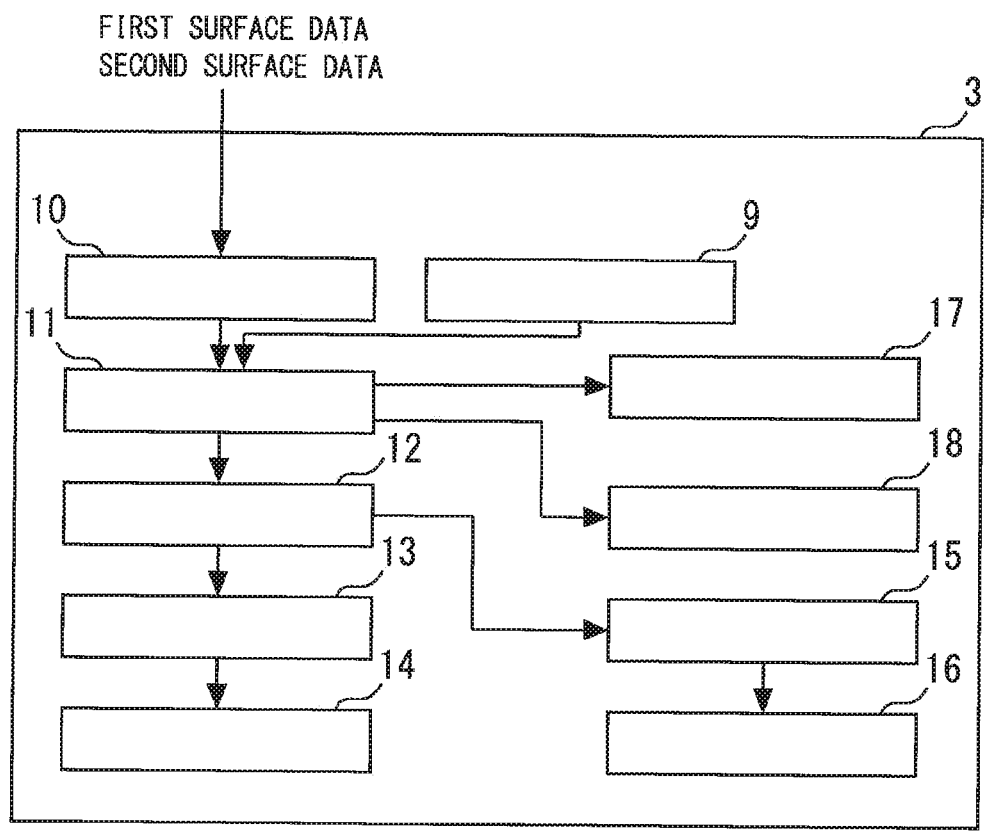
FIG. 4 is a diagram showing an example of a controller.

FIG. 4 is a diagram showing an example of the controller 3. The controller 3 includes, for example, a storage unit 9, a data processing unit 10, a similarity calculation unit 11, a phase calculation unit 12, a period calculation unit 13, and an abnormality detection unit 14.

Two pieces of reference data are stored in the storage unit 9. In the following description, one of the pieces of reference data stored in the storage unit 9 will be described as first reference data. The other piece of reference data stored in the storage unit 9 will be described as second reference data.

The data processing unit 10 processes the first surface data received from the sensor head 2 and outputs the processed data as final first surface data. The data processing unit 10 processes the second surface data received from the sensor head 2 and outputs the processed data as final second surface data. In the example described in the present embodiment, the data processing unit 10 constitutes a part of means which acquires surface data of the long body. In order to detect a pitch abnormality in the rope 1, data obtained by removing specific frequency components from surface data acquired by the sensor head 2 is desirably adopted as final surface data. Performing such data processing enables a component of the periodic pattern on the surface of the rope 1 to be enhanced.

Figure 5:
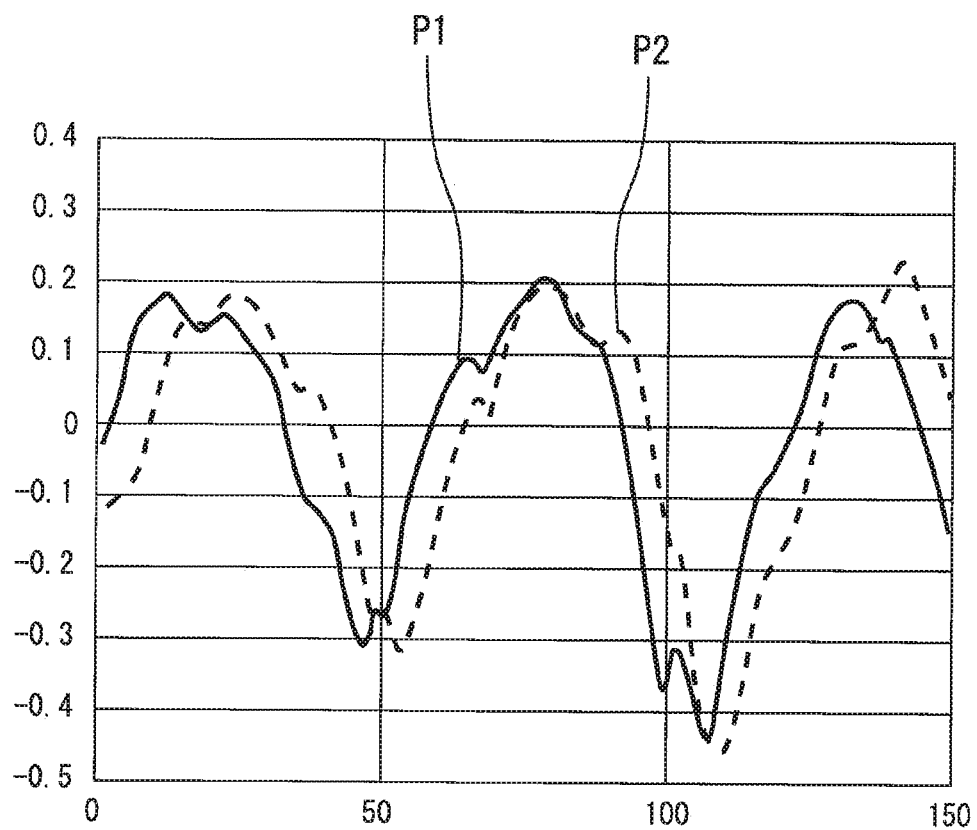
FIG. 5 is a diagram for illustrating a function of a data processing unit.

FIG. 5 is a diagram for illustrating a function of the data processing unit 10. FIG. 5 shows the first surface data P1 and the second surface data P2 after data processing by the data processing unit 10 is performed. For example, the data processing unit 10 acquires the first surface data P1 shown in FIG. 5 by performing a low-frequency component removal process on the first surface data P1 shown in FIG. 3. For example, the data processing unit 10 acquires the second surface data P2 shown in FIG. 5 by performing a low-frequency component removal process on the second surface data P2 shown in FIG. 3. In the example shown in FIG. 5, an effect of a diameter of the rope 1 has been removed from the first surface data P1 and the second surface data P2 shown in FIG. 3.

The function of the data processing unit 10 may be included in the sensor head 2. In addition, means which acquires surface data of the long body need not include the function of the data processing unit 10. In the example described in the present embodiment, output from the data processing unit 10 constitutes final output from means which acquires surface data of the long body. When the data processing unit 10 is not provided, output from the sensor head 2 constitutes the final output from means which acquires surface data of the long body.

Light is simultaneously emitted from the light source 4 and the light source 5. The first surface data P1 acquired at time t at the position L1 can be expressed as P (t, L1). The second surface data P2 acquired at the same time t at the position L2 can be expressed as P (t, L2). The first surface data P (t, L1) and the second surface data P (t, L2) can be expressed by an n-row, 1-column matrix as given below. For example, n denotes an integer equal to or larger than 2. FIG. 5 shows an example in which n=150.

$$P(t, L1) = \begin{pmatrix} p1(t, L1) \\ p2(t, L1) \\ \vdots \\ pn(t, L1) \end{pmatrix}$$ [Math. 1]

$$P(t, L2) = \begin{pmatrix} p1(t, L2) \\ p2(t, L2) \\ \vdots \\ pn(t, L2) \end{pmatrix}$$

Figure 6:
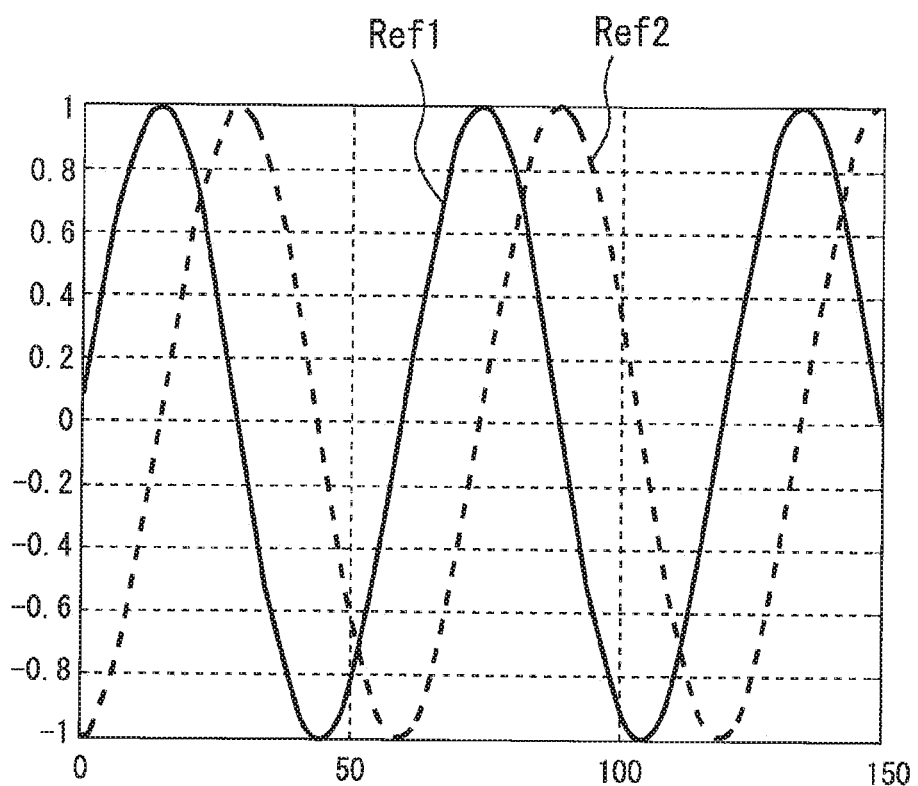
FIG. 6 is a diagram showing an example of reference data.

FIG. 6 is a diagram showing an example of reference data. As described above, the rope 1 has a periodic pattern on a surface thereof. For example, a sine wave having a same period as the period of the pattern formed on the surface of the rope 1 is stored as the first reference data in the storage unit 9. A cosine wave having a same period as the period of the pattern formed on the surface of the rope 1 is stored as the second reference data in the storage unit 9. The first reference data Ref1 and the second reference data Ref2 can be expressed by an n-row, 1-column matrix as given below. FIG. 6 shows an example in which n=150.

$$Ref1 = \begin{pmatrix} r1_1 \\ r1_2 \\ \vdots \\ r1_n \end{pmatrix}$$ [Math. 2]

$$Ref2 = \begin{pmatrix} r2_1 \\ r2_2 \\ \vdots \\ r2_n \end{pmatrix}$$

In the present embodiment, an example will be described in which the first surface data P (t, L1), the second surface data P (t, L2), the first reference data Ref1, and the second reference data Ref2 are data of multidimensional vectors or, in other words, vectors with n-number of elements. An inner product of the first reference data Ref1 and the second reference data Ref2 is favorably 0 as in the example shown in FIG. 6. The first reference data Ref1 and the second reference data Ref2 shown in FIG. 6 are sine waves in an orthogonal relationship. However, the inner product of the first reference data Ref1 and the second reference data Ref2 need not be 0. The first reference data Ref1 and the second reference data Ref2 are not limited to the example shown in FIG. 6.

The similarity calculation unit 11 calculates a similarity between surface data and reference data. For example, the similarity calculation unit 11 calculates a first similarity, a second similarity, a third similarity, and a fourth similarity. The first similarity represents a similarity between the first surface data output from the data processing unit 10 and the first reference data stored in the storage unit 9. The second similarity represents a similarity between the first surface data output from the data processing unit 10 and the second reference data stored in the storage unit 9. The third similarity represents a similarity between the second surface data output from the data processing unit 10 and the first reference data stored in the storage unit 9. The fourth similarity represents a similarity between the second surface data output from the data processing unit 10 and the second reference data stored in the storage unit 9.

For example, the similarity calculation unit 11 calculates, as the first similarity, a correlation coefficient ρ1 (t, L1) between the first surface data P (t, L1) and the first reference data Ref1. The similarity calculation unit 11 calculates, as the second similarity, a correlation coefficient ρ2 (t, L1) between the first surface data P (t, L1) and the second reference data Ref2. The similarity calculation unit 11 calculates, as the third similarity, a correlation coefficient ρ1 (t, L2) between the second surface data P (t, L2) and the first reference data Ref1. The similarity calculation unit 11 calculates, as the fourth similarity, a correlation coefficient ρ2 (t, L2) between the second surface data P (t, L2) and the second reference data Ref2.

Figure 7:
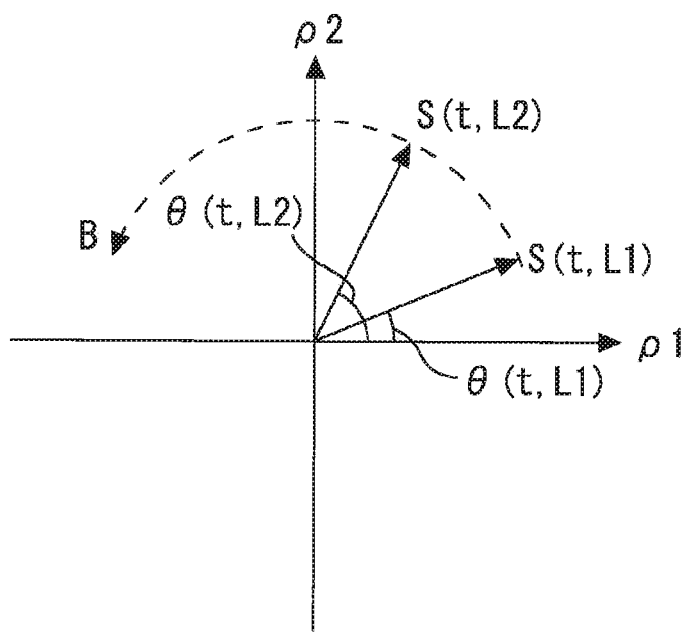
FIG. 7 is a diagram for illustrating a function of a phase calculation unit.

FIG. 7 is a diagram for illustrating a function of the phase calculation unit 12. The phase calculation unit 12 calculates a deflection angle of a similarity vector S as a phase θ. In the example described in the present embodiment, the phase calculation unit 12 calculates a phase θ (t, L1) of a similarity vector S (t, L1) related to the first surface data. The similarity vector S (t, L1) is a vector having, as elements, the correlation coefficient ρ1 (t, L1) and the correlation coefficient ρ2 (t, L1) calculated by the similarity calculation unit 11. The phase θ (t, L1) is a deflection angle of the similarity vector S (t, L1). In addition, the phase calculation unit 12 calculates a phase θ (t, L2) of a similarity vector S (t, L2) related to the second surface data. The similarity vector S (t, L2) is a vector having, as elements, the correlation coefficient ρ1 (t, L2) and the correlation coefficient ρ2 (t, L2) calculated by the similarity calculation unit 11. The phase θ (t, L2) is a deflection angle of the similarity vector S (t, L2).

FIG. 7 shows an example of plotting the similarity vector S (t, L1) and the similarity vector S (t, L2) on a plane having a similarity with the first reference data Ref1 as an abscissa and a similarity with the second reference data Ref2 as an ordinate which is orthogonal to the abscissa. For example, when the rope 1 moves in the −y direction, the similarity vector S (t, L1) and the similarity vector S (t, L2) rotate in a B direction shown in FIG. 7. A locus of the similarity vector S (t, L1) is a circular locus with a maximum radius of 1. In a similar manner, a locus of the similarity vector S (t, L2) is a circular locus with a maximum radius of 1. When the rope 1 moves precisely by a distance corresponding to one strand pitch, the similarity vector S (t, L1) and the similarity vector S (t, L2) make one rotation.

The period calculation unit 13 calculates a period of the pattern formed on the surface of the rope 1. In the example described in the present embodiment, the period matches the strand pitch of the rope 1 as described earlier. As shown in FIG. 7, an initial point of the similarity vector S is the origin. A terminal point of the similarity vector S is a point having, as coordinates, the elements of the similarity vector or, in other words, the two similarities calculated by the similarity calculation unit 11. The phase θ represents a direction of the similarity vector S. The period calculation unit 13 can calculate a strand pitch SP of the rope 1 according to the following equation.

$$SP = 2\pi \times \frac{dy}{d\theta} = \frac{2\pi(L2 - L1)}{\theta(t, L2) - \theta(t, L1)} \qquad [\text{Math. 3}]$$

As shown in the equation given above, the period calculation unit 13 calculates the strand pitch SP on the basis of the phase θ (t, L1) and the phase θ (t, L2) calculated by the phase calculation unit 12. For example, the period calculation unit 13 obtains the strand pitch SP by calculating a rate of positional change of a phase corresponding to a positional change in the y axis direction.

The abnormality detection unit 14 detects an abnormality having occurred in the rope 1. For example, the abnormality detection unit 14 detects a period abnormality in the pattern formed on the long body on the basis of the period calculated by the period calculation unit 13. For example, a reference range for determining that the period of the pattern is normal is stored in the storage unit 9 in advance. The abnormality detection unit 14 determines that a pitch abnormality has not occurred in the rope 1 when the period calculated by the period calculation unit 13 is within the reference range. The abnormality detection unit 14 determines that a pitch abnormality has occurred in the rope 1 when the period calculated by the period calculation unit 13 is not within the reference range.

Figure 8:
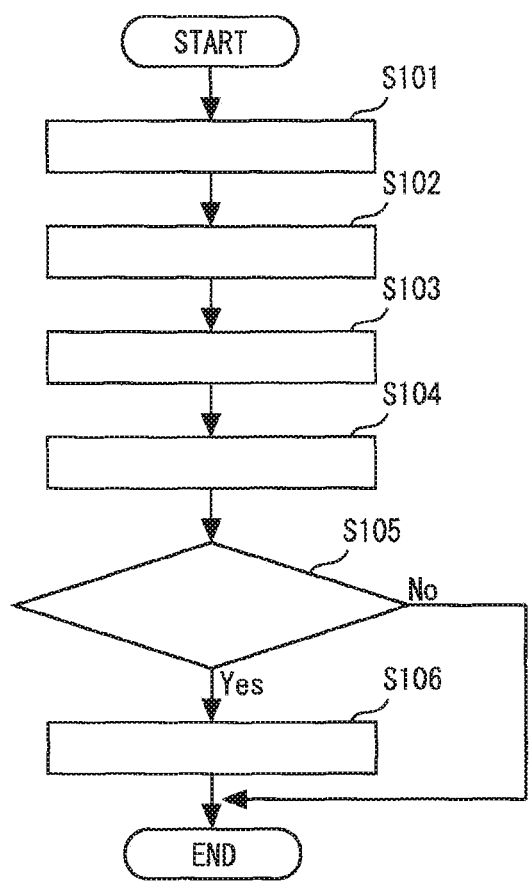
FIG. 8 is a flow chart showing an operation example of the detection device according to the first embodiment of the present invention.

FIG. 8 is a flow chart showing an operation example of the detection device according to the first embodiment of the present invention. FIG. 8 shows the processing flow described above. When a pitch abnormality is detected by the abnormality detection unit 14, an alarm may be raised from the controller 3.

With the example described in the present invention, an abnormality in the rope 1 can be detected even when a movement speed of the rope 1 fluctuates. The present detection device also has an advantage of being highly noise-resistant.

Hereinafter, other functions that can be provided in the present detection device will be described.

The controller 3 may further include a speed calculation unit 15 and a position calculation unit 16. The speed calculation unit 15 calculates a speed at which the rope 1 moves. The speed calculation unit 15 can calculate a movement speed V of the rope 1 at a time t according to the following equation.

$$V = SP \times \frac{1}{2\pi} \times \frac{d\theta}{dt} = \frac{\frac{d\theta}{dt}}{\frac{d\theta}{dy}} = \frac{\frac{\theta(t, L1) - \theta(t - \Delta t, L1)}{t - \Delta t}}{\frac{\theta(t, L2) - \theta(t, L1)}{L2 - L1}} \qquad [\text{Math. 4}]$$

For example, the operations shown in FIG. 8 are repetitively performed at constant intervals. Δt in the equation given above denotes a time interval at which surface data is acquired. As shown in the equation given above, the speed calculation unit 15 calculates the movement speed of the rope 1 on the basis of the phase θ (t, L1) and the phase θ (t, L2) calculated by the phase calculation unit 12. For example, the speed calculation unit 15 obtains the movement speed of the rope 1 by calculating a change of the phase θ (t, L1) or the phase θ (t, L2) in accordance with a lapse of time.

The position calculation unit 16 calculates a position of an abnormality having occurred in the rope 1. The position calculation unit 16 calculates the position described above on the basis of the movement speed V of the rope 1 calculated by the speed calculation unit 15. For example, the position calculation unit 16 can determine how much the rope 1 has moved from a position where acquisition of surface data had been started by integrating the movement speed V of the rope 1 calculated by the speed calculation unit 15. The position calculation unit 16 calculates a position of a detected abnormality on the rope 1 on the basis of a movement distance at the moment of detection of the abnormality by the abnormality detection unit 14. With the calculation method described above, a position can be calculated even when a strand pitch of the rope 1 is unknown or fluctuates.

The controller 3 may further include a disabling unit 17. The disabling unit 17 disables abnormality detection by the abnormality detection unit 14. As shown in FIG. 7, the locus of the similarity vector S (t, L1) has a circular shape. If irregularities formed by twisting the plurality of strands together are neatly arranged on the surface of the rope 1, the locus of the similarity vector S (t, L1) continuously traces a similar circle having the origin as its center.

On the other hand, when an abnormality occurs in signal transmission due to inclusion of a non-negligible large noise or the like in a signal received by the controller 3, the locus of the similarity vector S (t, L1) changes so as to approach the origin. Therefore, by setting, in advance, a normal range with respect to a norm of the similarity vector S (t, L1), a decline in reliability of acquired surface data can be detected. The normal range is set to, for example, 0.3 to 1. A similar description applies to the similarity vector S (t, L2).

For example, the disabling unit 17 disables the function of the abnormality detection unit 14 for detecting abnormalities on the basis of the norm of the similarity vector S (t, L1). When the norm of the similarity vector S (t, L1) is outside of the normal range, the disabling unit 17 prevents abnormalities from being detected by the abnormality detection unit 14. Alternatively, the disabling unit 17 may disable the function of the abnormality detection unit 14 for detecting abnormalities on the basis of the norm of the similarity vector S (t, L2). For example, when the norm of the similarity vector S (t, L2) is outside of the normal range, the disabling unit 17 prevents abnormalities from being detected by the abnormality detection unit 14. Alternatively, the disabling unit 17 may disable abnormality detection by the abnormality detection unit 14 when both of the norm of the similarity vector S (t, L1) and the norm of the similarity vector S (t, L2) are outside of the normal ranges.

While the abnormality detection function by the abnormality detection unit 14 is being disabled by the disabling unit 17, the position calculation unit 16 may calculate a movement distance of the rope 1 using an immediately previously calculated strand pitch SP. Accordingly, appropriate interpolation can be performed.

The controller 3 may further include an abnormality detection unit 18. The abnormality detection unit 18 detects an abnormality in the rope 1 which differs from the abnormality detected by the abnormality detection unit 14. For example, the abnormality detection unit 18 detects an abnormality in the pattern formed on the surface of the rope 1.

As described earlier, the locus of the similarity vector S (t, L1) has a circular shape. When an abnormality has not occurred in signal transmission, the locus of the similarity vector S (t, L1) continuously traces a similar circle having the origin as its center as long as irregularities formed by twisting the plurality of strands together are neatly arranged on the surface of the rope 1. On the other hand, when a defect occurs in the twist due to intervals of the strands becoming uneven or the like, the locus of the similarity vector S (t, L1) changes so as to approach the origin. Therefore, by setting, in advance, a normal range with respect to the norm of the similarity vector S (t, L1), an occurrence of an abnormality in the pattern formed on the surface of the rope 1 can be detected. The normal range is set to, for example, 0.6 to 1. A similar description applies to the similarity vector S (t, L2).

For example, the abnormality detection unit 18 detects that an abnormality has occurred in the pattern of the rope 1 on the basis of the norm of the similarity vector S (t, L1). The abnormality detection unit 18 detects that an abnormality has occurred in the pattern of the rope 1 when the norm of the similarity vector S (t, L1) is outside of the normal range described above. With the example described in the present embodiment, the abnormality detection unit 18 detects a shape abnormality in the rope 1. The abnormality detection unit 18 may detect that an abnormality has occurred in the pattern of the rope 1 on the basis of the norm of the similarity vector S (t, L2). For example, the abnormality detection unit 18 detects a shape abnormality in the rope 1 when the norm of the similarity vector S (t, L2) is outside of the normal range described above. Alternatively, the abnormality detection unit 18 may detect a shape abnormality in the rope 1 when both the norm of the similarity vector S (t, L1) and the norm of the similarity vector S (t, L2) are outside of the normal ranges.

When an abnormality in the pattern is detected by the abnormality detection unit 18, data that enables the abnormality to be confirmed may be stored in the storage unit 9. For example, when an abnormality in the pattern is detected by the abnormality detection unit 18, surface data used to detect the abnormality is stored in the storage unit 9. As will be described later, the sensor head 2 may include a camera for acquiring surface data. When an abnormality in the pattern is detected by the abnormality detection unit 18, data of an image photographed by the camera may be stored in the storage unit 9.

Figure 9:
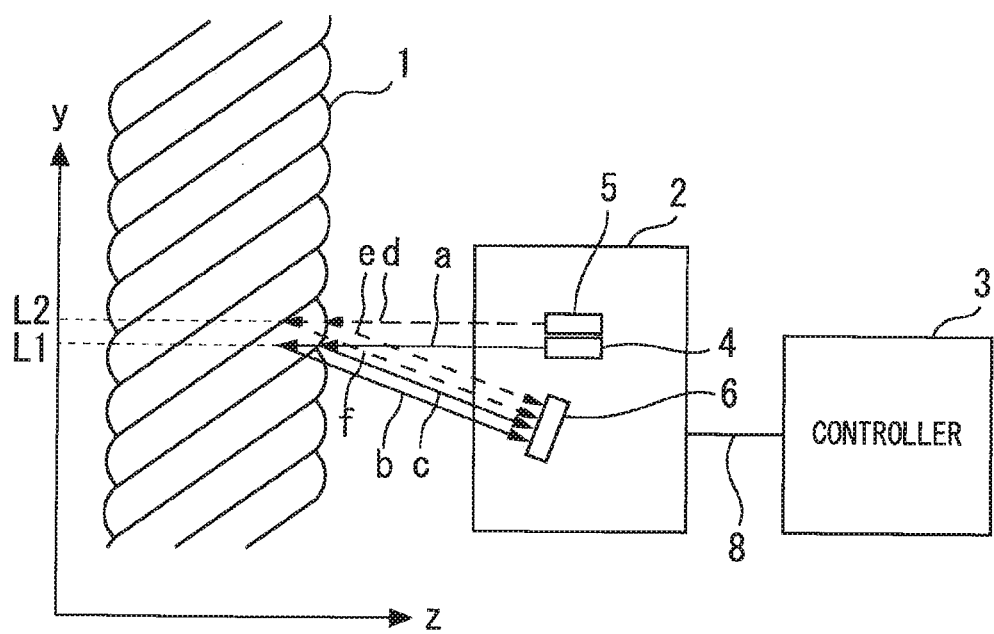
FIG. 9 is a diagram for illustrating another example of a sensor head.

FIG. 9 is a diagram for illustrating another example of the sensor head 2. For example, the sensor head 2 shown in FIG. 9 includes the light source 4, the light source 5, and the light receiving element 6. FIG. 9 shows an example in which both light from the light source 4 having been reflected by the surface of the rope 1 and light from the light source 5 having been reflected by the surface of the rope 1 are received by one light receiving element 6. In the example shown in FIG. 9, the light source 5 desirably strikes the rope 1 with light of a wavelength that differs from a wavelength of light from the light source 4.

FIG. 10 is a diagram showing a processing method of a light reception image acquired by the light receiving element 6. An upper half of FIG. 10 shows a light reception image of the light receiving element 6. A lower half of FIG. 10 shows first surface data P1 and second surface data P2 converted from the light reception image of the light receiving element 6. An abscissa of the lower half of FIG. 10 shows that each of the first surface data P1 and the second surface data P2 includes a plurality of pieces of data in the x direction. The number of pieces of data included in surface data is arbitrarily determined.

With the example shown in FIGS. 9 and 10, the sensor head 2 need not be provided with a plurality of light receiving elements. In addition, an extraction process of surface data can be readily performed as long as the wavelength of light from the light source 4 differs from the wavelength of light from the light source 5.

Figure 11:
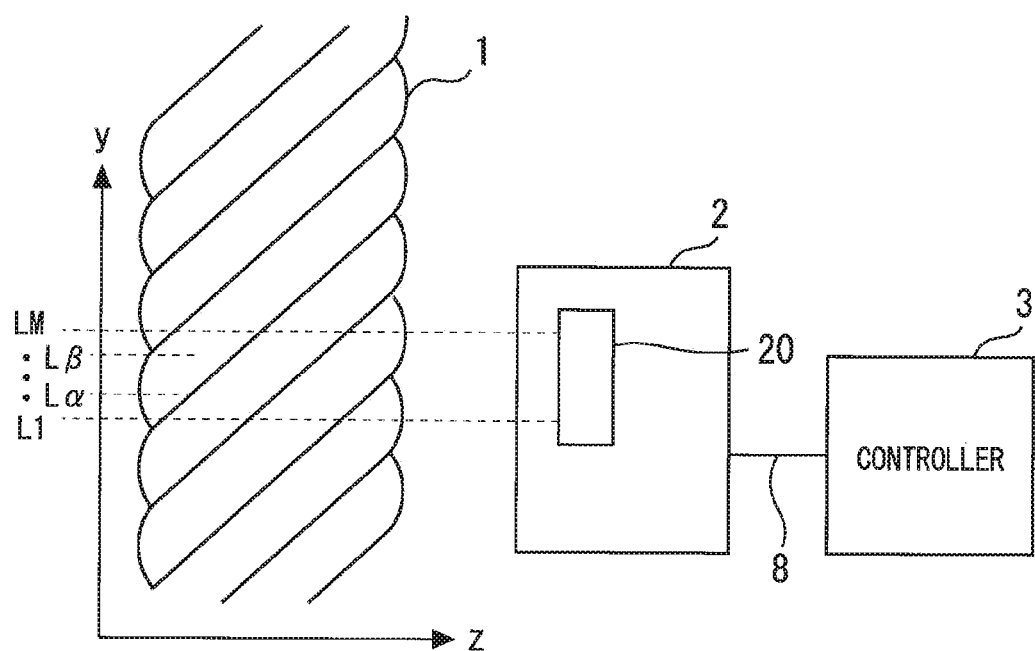
FIG. 11 is a diagram for illustrating another example of the sensor head.
Figure 12:
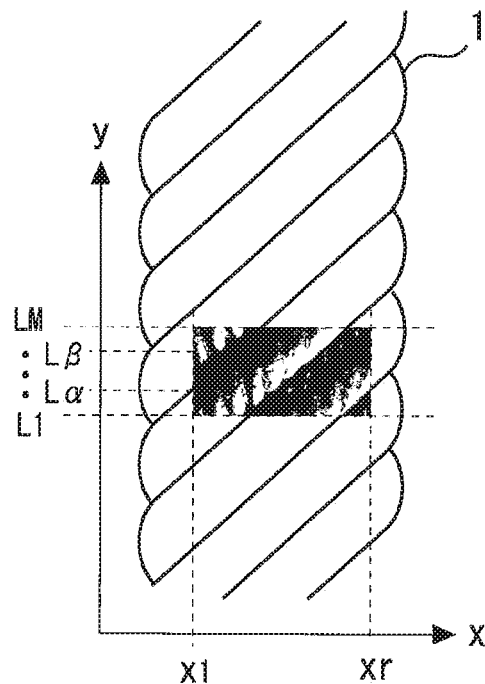
FIG. 12 is a diagram for illustrating another example of the sensor head.

The sensor head 2 is not limited to an optical profile measuring instrument. FIGS. 11 and 12 are diagrams for illustrating another example of the sensor head 2. For example, the sensor head 2 shown in FIGS. 11 and 12 includes a camera 20. The sensor head 2 may acquire, as surface data, data obtained from data of an image of the surface of the rope 1 photographed by the camera 20.

Data of an image photographed by the camera 20 does not include information related to height. The sensor head 2 may acquire, as surface data, data representing a color and a gradation of the color given to the surface of the rope 1. For example, the sensor head 2 acquires data representing a color and a gradation of the color given to the surface of the rope 1 within a range expressed by $xl \le x \le xr$ and $L1 \le y \le LM$ among the surface of the rope 1. The data corresponds to M-number of pieces of surface data. The sensor head 2 outputs, as the first surface data and the second surface data, two pieces of surface data set in advance from the M-number of pieces of surface data.

Figure 13:
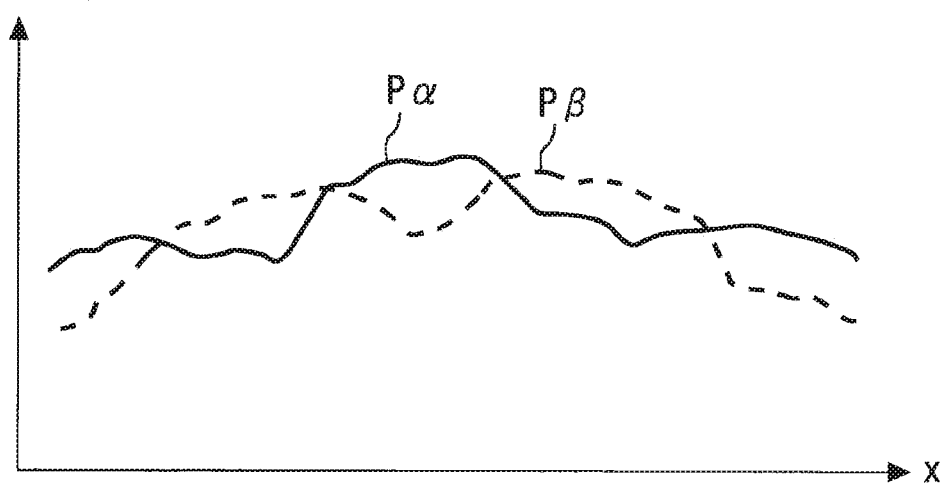
FIG. 13 is a diagram showing a processing method of data of an image photographed by a camera.

FIG. 13 is a diagram showing a processing method of data of an image photographed by the camera 20. FIG. 13 shows an example of acquiring, as first surface data Pα, data representing a color and a gradation of the color given to the surface of a portion passing a position expressed by $y=L\alpha$ in the rope 1. In a similar manner, FIG. 13 shows an example of acquiring, as second surface data Pβ, data representing a color and a gradation of the color given to the surface of a portion passing a position expressed by $y=L\beta$ in the rope 1.

Second Embodiment

In the present embodiment, an example for improving calculation accuracy of the strand pitch SP will be described. A detection device according to the present embodiment is similar to that of, for example, the example shown in FIG. 11. For example, the detection device includes the sensor head 2 and the controller 3. For example, the sensor head 2 includes the camera 20.

For example, the sensor head 2 acquires, as surface data, data representing a color and a gradation of the color given to the surface of the rope 1. The sensor head 2 acquires M-number of pieces of surface data from data of an image photographed by the camera 20. For example, M denotes a natural number equal to or larger than 3.

Figure 14:
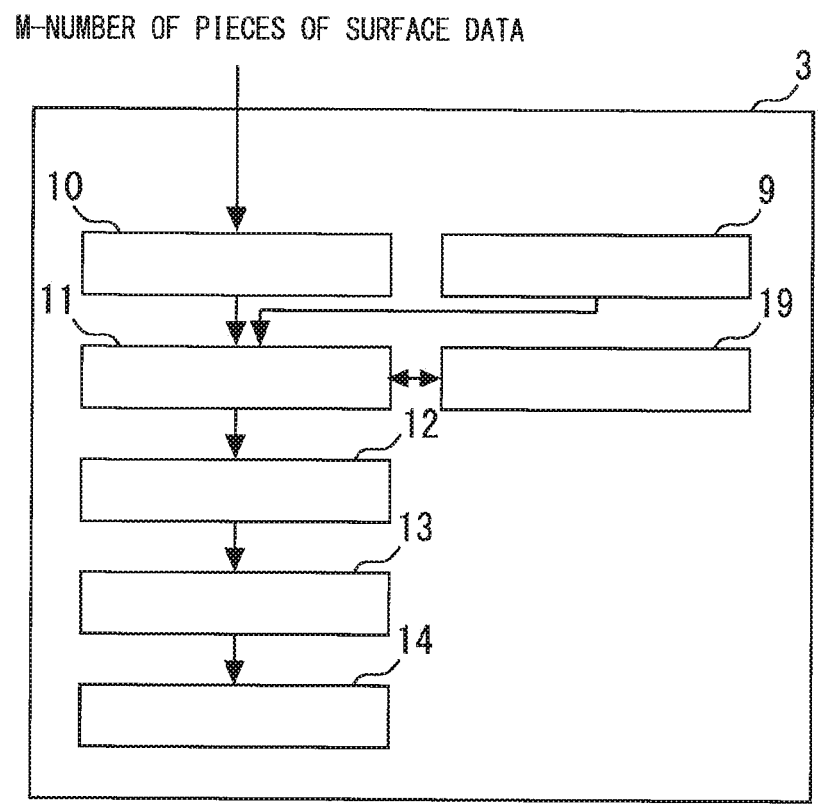
FIG. 14 is a diagram showing an example of the controller according to a second embodiment of the present invention.

FIG. 14 is a diagram showing an example of the controller 3 according to the second embodiment of the present invention. In the example shown in FIG. 14, the controller 3 includes the storage unit 9, the data processing unit 10, a selection unit 19, the similarity calculation unit 11, the phase calculation unit 12, the period calculation unit 13, and the abnormality detection unit 14. The controller 3 need not include the data processing unit 10. The controller 3 may further include the speed calculation unit 15, the position calculation unit 16, the disabling unit 17, and the abnormality detection unit 18.

First reference data Ref1 and second reference data Ref2 are stored in the storage unit 9. For example, the first reference data Ref1 can be expressed by an n-row, 1-column matrix. The second reference data Ref2 can be expressed by an n-row, 1-column matrix.

The data processing unit 10 processes each piece of surface data received from the sensor head 2 into surface data that can be compared with reference data. For example, the data processing unit 10 performs a bias removal process on each piece of surface data received from the sensor head 2. For example, M-number of pieces of surface data P (t, L1), P (t, L2), P (t, LM) having been subjected to the bias removal process are output from the data processing unit 10. The surface data P (t, L1) is data representing a color and a gradation of the color given to the surface of a portion passing y=L1 at a time tin the rope 1. The surface data P (t, L2) is data representing a color and a gradation of the color given to the surface of a portion passing y=L2 at the time tin the rope 1. The surface data P (t, LM) is data representing a color and a gradation of the color given to the surface of a portion passing y=LM at the time tin the rope 1. Values of L1 to LM are set in advance.

The selection unit 19 selects first surface data P (t, Lα) and second surface data P (t, Lβ) on the basis of conditions set in advance from the M-number of pieces of surface data output from the data processing unit 10.

The similarity calculation unit 11 calculates a similarity between the surface data selected by the selection unit 19 and the reference data. In other words, the similarity calculation unit 11 calculates a first similarity, a second similarity, a third similarity, and a fourth similarity. The first similarity represents a similarity between the first surface data selected by the selection unit 19 and the first reference data stored in the storage unit 9. The second similarity represents a similarity between the first surface data selected by the selection unit 19 and the second reference data stored in the storage unit 9. The third similarity represents a similarity between the second surface data selected by the selection unit 19 and the first reference data stored in the storage unit 9. The fourth similarity represents a similarity between the second surface data selected by the selection unit 19 and the second reference data stored in the storage unit 9.

The function of the phase calculation unit 12 is similar to the function disclosed in the first embodiment. The function of the period calculation unit 13 is similar to the function disclosed in the first embodiment. The function of the abnormality detection unit 14 is similar to the function disclosed in the first embodiment.

Figure 15:
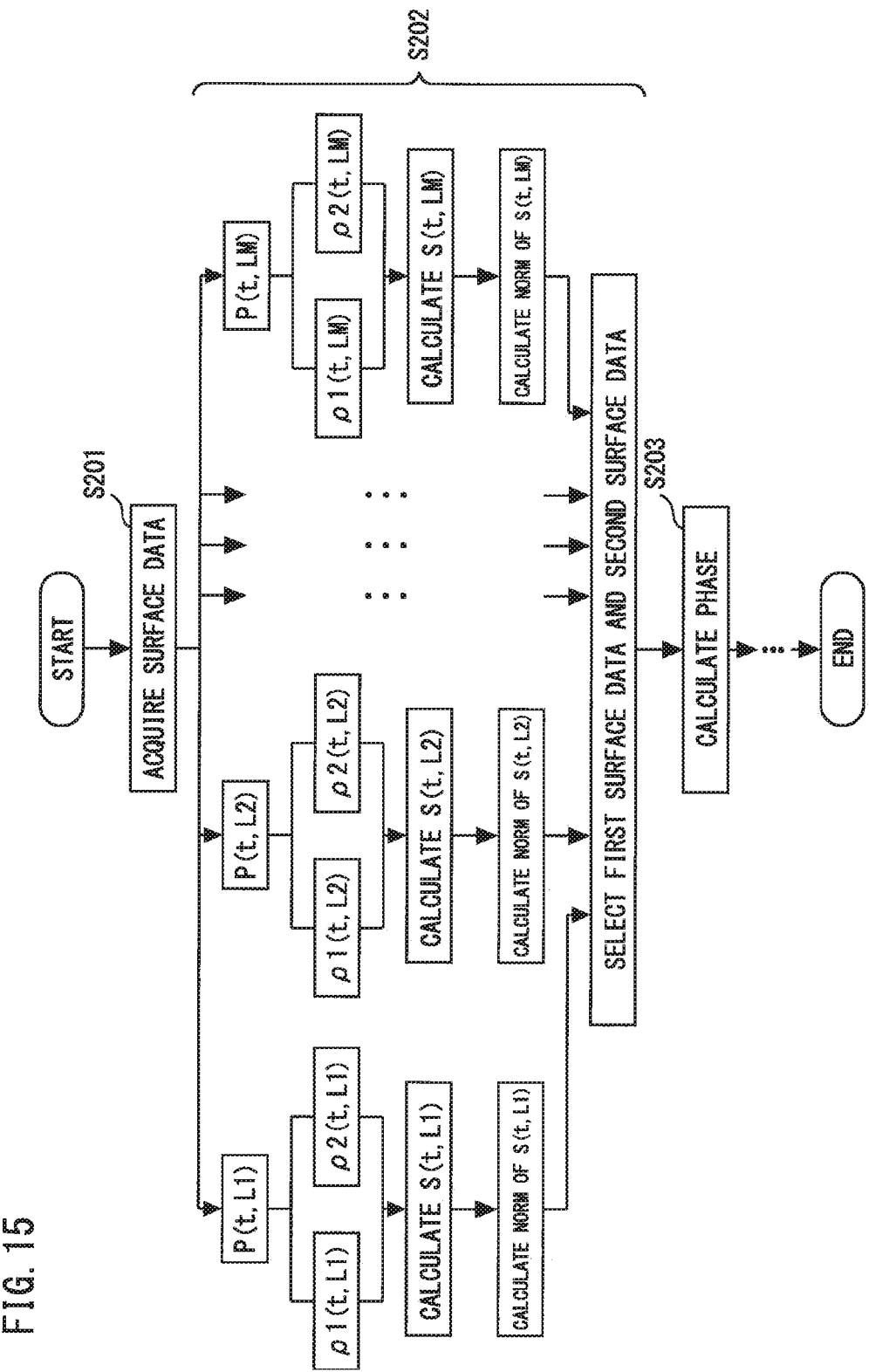
FIG. 15 is a flow chart showing an operation example of the detection device according to the second embodiment of the present invention.

FIG. 15 is a flow chart showing an operation example of the detection device according to the second embodiment of the present invention. As described above, M-number of pieces of surface data are output from the data processing unit 10 (S201). The selection unit 19 selects the first surface data P (t, Lα) and the second surface data P (t, Lβ) from the M-number of pieces of surface data output from the data processing unit 10 (S202).

For example, with respect to each piece of surface data output from the data processing unit 10, the similarity calculation unit 11 calculates a similarity with the first reference data and a similarity with the second reference data. FIG. 15 shows an example in which a correlation coefficient ρ1 is calculated as the similarity with the first reference data and a correlation coefficient ρ2 is calculated as the similarity with the second reference data. Next, with respect to each piece of surface data, a similarity vector S having the correlation coefficient ρ1 and the correlation coefficient ρ2 as elements is calculated. Furthermore, with respect to each piece of surface data, a norm of the similarity vector S is calculated.

Figure 16:
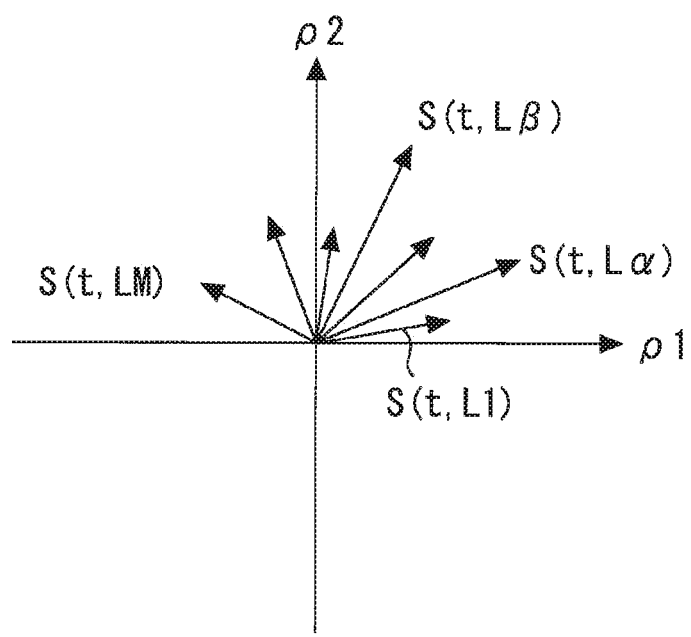
FIG. 16 is a diagram for illustrating a function of a selection unit.

For example, the selection unit 19 selects the first surface data P (t, Lα) and the second surface data P (t, Lβ) on the basis of the calculated norm of the similarity vector S. FIG. 16 is a diagram for illustrating a function of the selection unit 19. For example, the selection unit 19 selects surface data with a largest norm of the similarity vector S and surface data with a second largest norm of the similarity vector S from the M-number of pieces of surface data output from the data processing unit 10 as the first surface data P (t, Lα) and the second surface data P (t, Lβ). In this case, Lβ>Lα.

When the first surface data P (t, Lα) and the second surface data P (t, Lβ) are selected in S202, processes similar to the processes in S103 to S106 in FIG. 8 are performed. In the example shown in FIG. 15, ρ1 (t, Lα), ρ2 (t, Lα), ρ1 (t, Lβ), and ρ2 (t, Lβ) have already been calculated in S202. When the first surface data P (t, Lα) and the second surface data P (t, Lβ) are selected by the selection unit 19, the phase calculation unit 12 calculates a phase θ (t, Lα) of a similarity vector S (t, Lα) (S203). The similarity vector S (t, Lα) is a vector having, as elements, the correlation coefficient ρ1 (t, Lα) and the correlation coefficient ρ2 (t, Lα) calculated by the similarity calculation unit 11. The phase θ (t, Lα) is a deflection angle of the similarity vector S (t, Lα). In addition, the phase calculation unit 12 calculates a phase θ (t, Lβ) of a similarity vector S (t, Lβ) (S203). The similarity vector S (t, Lβ) is a vector having, as elements, the correlation coefficient ρ1 (t, Lβ) and the correlation coefficient ρ2 (t, Lβ) calculated by the similarity calculation unit 11. The phase θ (t, Lβ) is a deflection angle of the similarity vector S (t, Lβ).

For example, the period calculation unit 13 calculates the strand pitch SP according to the following equation on the basis of the phase θ (t, Lα) and the phase θ (t, Lβ) calculated by the phase calculation unit 12.

$$SP = 2\pi \times \frac{dy}{d\theta} = \frac{2\pi(L\beta - L\alpha)}{\theta(t, L\beta) - \theta(t, L\alpha)} \qquad \text{[Math. 5]}$$

The abnormality detection unit 14 detects a period abnormality in the pattern formed on the long body on the basis of the period calculated by the period calculation unit 13. For example, the abnormality detection unit 14 determines that a pitch abnormality has occurred in the rope 1 when the period calculated by the period calculation unit 13 is outside of the reference range.

With the example described in the present invention, an abnormality in the rope 1 can be detected even when a movement speed of the rope 1 fluctuates. With the example described in the present embodiment, calculation accuracy of the strand pitch SP can be improved.

In order to reduce the effect of noise, the selection unit 19 may select the first surface data P (t, Lα) and the second surface data P (t, Lβ) by a method that differs from the method described above. For example, the selection unit 19 first selects surface data of which the norm of the similarity vector S is equal to or larger than a reference value from the M-number of pieces of surface data output from the data processing unit 10. The reference value is stored in advance in the storage unit 9. For example, the reference value is 0.3. The selection unit 19 selects, as the first surface data P (t, Lα) and the second surface data P (t, Lβ), two pieces of surface data which maximizes an angle formed between similarity vectors S from the pieces of surface data of which the norm of the similarity vector S is equal to or larger than the reference value.

Any of the features disclosed in the first embodiment may be adopted as features not disclosed in the present embodiment.

Third Embodiment

As described earlier, an example of a long body to be a detection object of the present detection device is a wire rope used in an elevator. An elevator car is suspended in a shaft by, for example, a plurality of wire ropes. When an elevator car is suspended by a plurality of wire ropes, a same tension desirably acts on each of the wire ropes.

For example, when a large tension acts on only one wire rope, elongation occurs in the wire rope. With an elongated wire rope, a strand pitch increases. In other words, a pitch abnormality occurs in the wire rope. In the present embodiment, an example in which a plurality of long bodies are detection objects of the detection device will be described.

Figure 17:
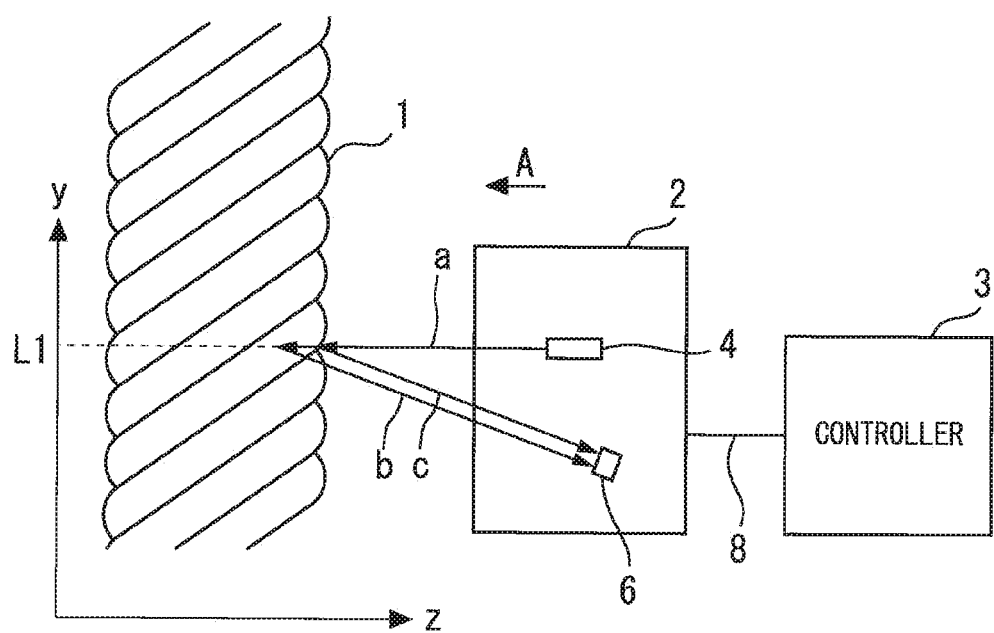
FIG. 17 is a diagram showing an example of the detection device according to a third embodiment of the present invention.
Figure 18:
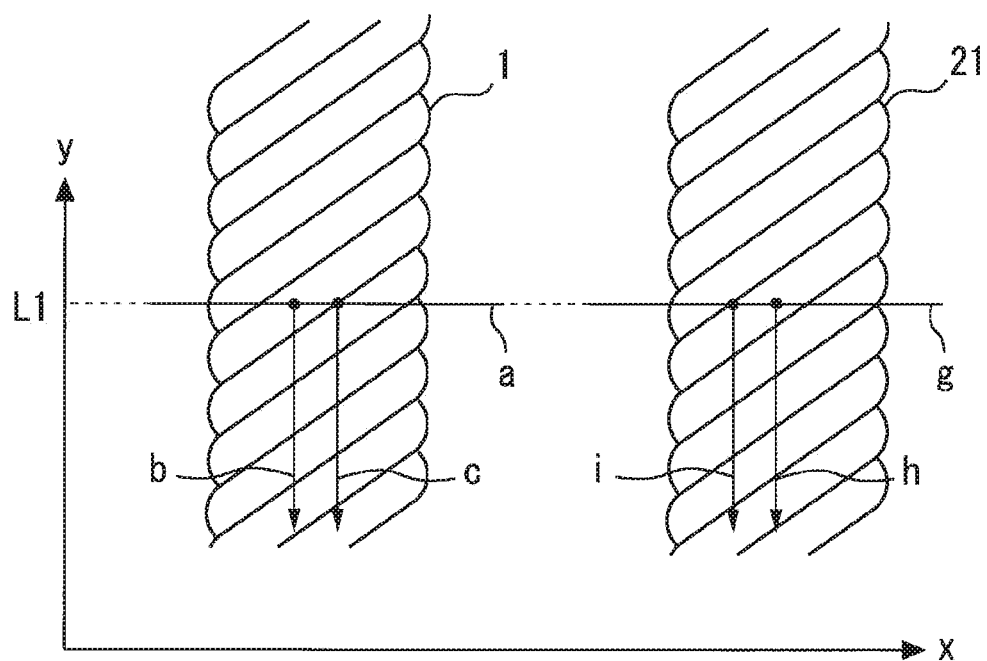
FIG. 18 is a diagram viewing long bodies from a direction of an arrow A shown in FIG. 17.

FIG. 17 is a diagram showing an example of the detection device according to a third embodiment of the present invention. FIG. 18 is a diagram viewing long bodies from a direction of an arrow A shown in FIG. 17. FIG. 18 shows an example in which a rope 21 is arranged in parallel to the rope 1.

The rope 21 moves in the longitudinal direction in a similar manner to the rope 1. For example, the rope 21 moves in the +y direction or the −y direction. The rope 21 may move in both the +y direction and the −y direction. The rope 21 includes a plurality of strands. The rope 21 is formed by twisting the plurality of strands together. The rope 21 includes, on a surface thereof, a same pattern as the pattern formed on the surface of the rope 1.

For example, the detection device includes the sensor head 2 and the controller 3. For example, the sensor head 2 includes the light source 4 and the light receiving element 6. In the example described in the present embodiment, the light source 4 simultaneously irradiates light toward both the surface of the rope 1 and the surface of the rope 21. FIGS. 17 and 18 show an example in which the light source 4 irradiates a laser beam in a direction orthogonal to the longitudinal direction of the rope 1 and to the longitudinal direction of the rope 21. Light irradiated from the light source 4 strikes the rope 1 and the rope 21 at a same height. In the example shown in FIGS. 17 and 18, the light irradiated from the light source 4 strikes linearly from an end on one side to an end on another side of the rope 1 so as to traverse the rope 1. In a similar manner, the light irradiated from the light source 4 strikes linearly from an end on one side to an end on another side of the rope 21 so as to traverse the rope 21.

The light receiving element 6 receives light reflected by the surface of the rope 1 among the light irradiated from the light source 4. In addition, the light receiving element 6 receives light reflected by the surface of the rope 21 among the light irradiated from the light source 4. The light receiving element 6 is arranged obliquely with respect to a direction in which the light source 4 irradiates light. The light receiving element 6 receives light obliquely reflected at a certain angle with respect to the longitudinal direction of the rope 1 among the light from the light source 4 reflected by the surface of the rope 1. In a similar manner, the light receiving element 6 receives light obliquely reflected at a certain angle with respect to the longitudinal direction of the rope 1 among the light from the light source 4 reflected by the surface of the rope 21.

Light a shown in FIGS. 17 and 18 is light irradiated toward the rope 1 from the light source 4. For example, the light a strikes the surface of the rope 1 at y=L1. Light b and light c are light reflected at an angle at which light is received by the light receiving element 6 among the light a reflected by the surface of the rope 1. When the light receiving element 6 receives the light b, the light c, and the like, the sensor head 2 acquires data representing a sectional shape of a portion struck by the light from the light source 4 in the rope 1 as first surface data.

In a similar manner, light g shown in FIGS. 17 and 18 is light irradiated toward the rope 21 from the light source 4. For example, the light g strikes the surface of the rope 21 at y=L1. Light h and light i are light reflected at an angle at which light is received by the light receiving element 6 among the light g reflected by the surface of the rope 21. When the light receiving element 6 receives the light h, the light i, and the like, the sensor head 2 acquires data representing a sectional shape of a portion struck by the light from the light source 4 in the rope 21 as second surface data.

Figure 19:
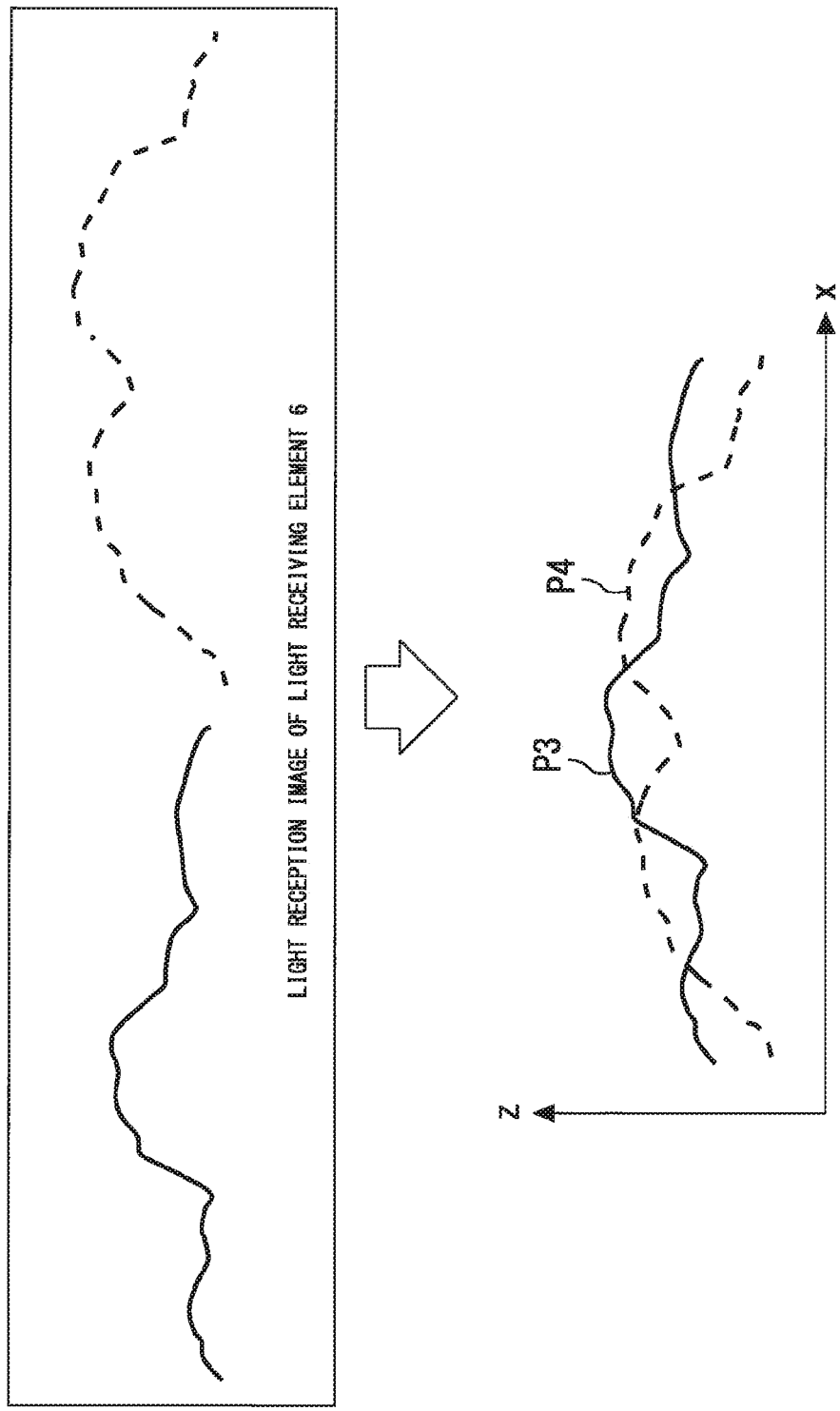
FIG. 19 is a diagram showing a processing method of a light reception image acquired by a light receiving element.

FIG. 19 is a diagram showing a processing method of a light reception image acquired by the light receiving element 6. An upper half of FIG. 19 shows a light reception image of the light receiving element 6. A lower half of FIG. 19 shows first surface data P3 and second surface data P4 converted from the light reception image of the light receiving element 6. An abscissa of the lower half of FIG. 19 shows that each of the first surface data P3 and the second surface data P4 includes a plurality of pieces of data in the x direction. The number of pieces of data included in surface data is arbitrarily determined.

Figure 20:
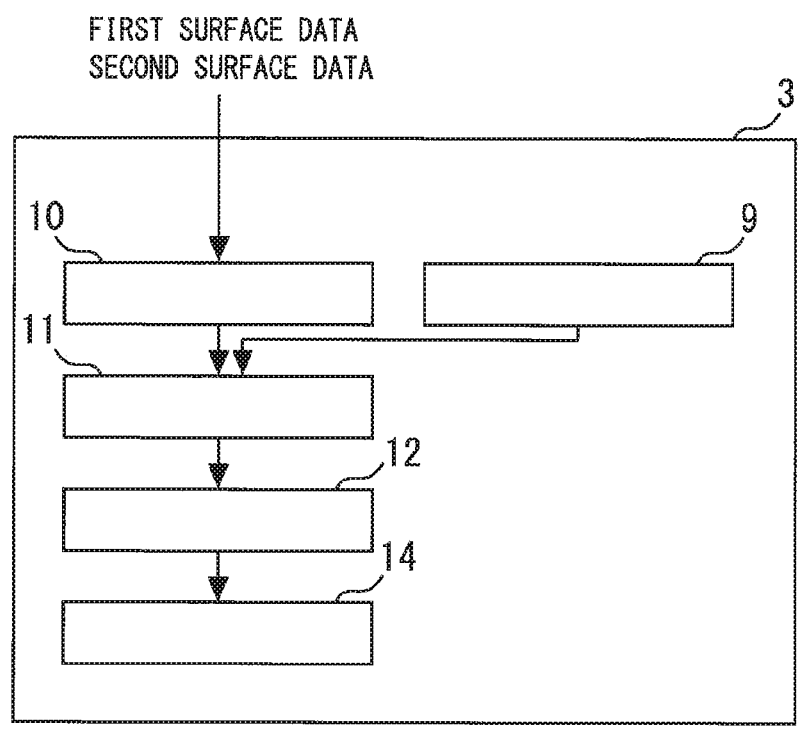
FIG. 20 is a diagram showing an example of the controller.

FIG. 20 is a diagram showing an example of the controller 3. The controller 3 includes, for example, the storage unit 9, the data processing unit 10, the similarity calculation unit 11, the phase calculation unit 12, and the abnormality detection unit 14. The controller 3 need not include the data processing unit 10. The controller 3 may further include the disabling unit 17 and the abnormality detection unit 18.

First reference data Ref1 and second reference data Ref2 are stored in the storage unit 9. For example, the first reference data Ref1 can be expressed by an n-row, 1-column matrix. The second reference data Ref2 can be expressed by an n-row, 1-column matrix.

For example, the data processing unit 10 processes the first surface data received from the sensor head 2 and outputs the processed data as final first surface data. For example, the data processing unit 10 processes the second surface data received from the sensor head 2 and outputs the processed data as final second surface data.

The similarity calculation unit 11 calculates a similarity between surface data and reference data. For example, the similarity calculation unit 11 calculates, as the first similarity, a correlation coefficient ρ1 (t, L1 (P3)) between first surface data P3 (t, L1) output from the data processing unit 10 and the first reference data Ref1. The similarity calculation unit 11 calculates, as the second similarity, a correlation coefficient ρ2 (t, L1 (P3)) between the first surface data P3

(t, L1) output from the data processing unit 10 and the second reference data Ref2. The similarity calculation unit 11 calculates, as the third similarity, a correlation coefficient ρ1 (t, L1 (P4)) between second surface data P4 (t, L1) output from the data processing unit 10 and the first reference data Ref1. The similarity calculation unit 11 calculates, as the fourth similarity, a correlation coefficient ρ2 (t, L1 (P4)) between the second surface data P4 (t, L1) output from the data processing unit 10 and the second reference data Ref2.

Figure 21:
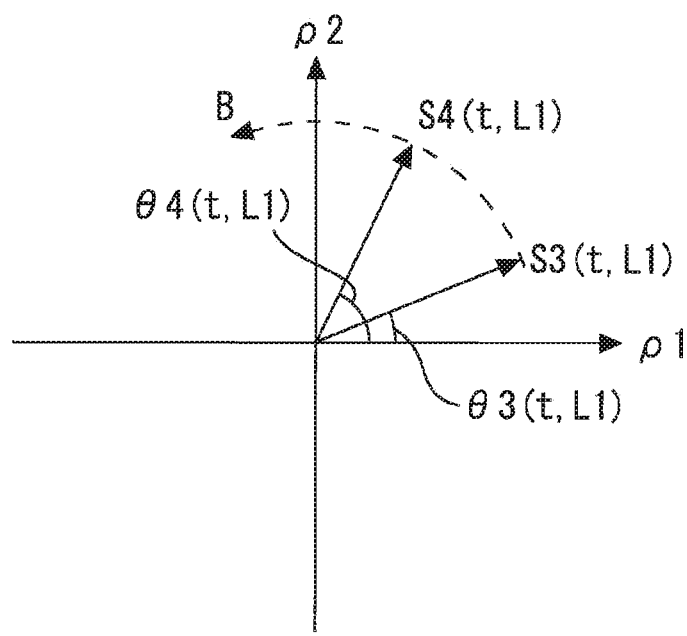
FIG. 21 is a diagram for illustrating a function of the phase calculation unit.

FIG. 21 is a diagram for illustrating a function of the phase calculation unit 12. The phase calculation unit 12 calculates a deflection angle of a similarity vector S as a phase θ. In the example described in the present embodiment, the phase calculation unit 12 calculates a phase θ3 (t, L1) of a similarity vector S3 (t, L1) related to the first surface data. The similarity vector S3 (t, L1) is a vector having, as elements, the correlation coefficient ρ1 (t, L1 (P3)) and the correlation coefficient ρ2 (t, L1 (P3)) calculated by the similarity calculation unit 11. The phase θ3 (t, L1) is a deflection angle of the similarity vector S3 (t, L1). In addition, the phase calculation unit 12 calculates a phase θ4 (t, L1) of a similarity vector S4 (t, L1) related to the second surface data. The similarity vector S4 (t, L1) is a vector having, as elements, the correlation coefficient ρ1 (t, L1 (P4)) and the correlation coefficient ρ2 (t, L1 (P4)) calculated by the similarity calculation unit 11. The phase θ4 (t, L1) is a deflection angle of the similarity vector S4 (t, L1).

When an elevator car is suspended in a shaft by the rope 1 and the rope 21, a speed at which the rope 1 moves and a speed at which the rope 21 moves are the same. When a strand pitch of the rope 1 and a strand pitch of the rope 21 are the same, an angle formed by the similarity vector S3 (t, L1) and the similarity vector S4 (t, L1) is constant regardless of the speed described above. The angle formed by the similarity vector S3 (t, L1) and the similarity vector S4 (t, L1) is a difference or, in other words, a phase difference between the phase θ4 (t, L1) and the phase θ3 (t, L1).

In the example described in the present embodiment, the abnormality detection unit 14 detects that an abnormality has occurred in the rope 1 or the rope 21 on the basis of the phase θ4 (t, L1) and the phase θ3 (t, L1) calculated by the phase calculation unit 12. For example, the abnormality detection unit 14 detects a period abnormality in the pattern formed on the surface of the rope 1 or the pattern formed on the surface of the rope 21. For example, a reference range for determining that the period of the pattern is normal is stored in the storage unit 9 in advance. The abnormality detection unit 14 determines that a pitch abnormality has not occurred in both the rope 1 and the rope 21 when the difference between the phase θ4 (t, L1) and the phase θ3 (t, L1) is within the reference range. The abnormality detection unit 14 determines that a pitch abnormality has occurred in any one of the rope 1 and the rope 21 when the difference between the phase θ4 (t, L1) and the phase θ3 (t, L1) is not within the reference range.

With the example described in the present embodiment, the detection device can detect a plurality of long bodies as detection objects. In addition, with the example described in the present invention, an occurrence of an abnormality can be detected even when a movement speed of the rope 1 and the rope 21 fluctuates.

In the example described in the present embodiment, when the controller 3 further includes the abnormality detection unit 18, the abnormality detection unit 18 detects that an abnormality has occurred in the pattern of the rope 1 on the basis of the norm of the similarity vector S3 (t, L1). For example, the abnormality detection unit 18 detects that an abnormality has occurred in the pattern of the rope 1 when the norm of the similarity vector S3 (t, L1) is outside of the normal range. In addition, the abnormality detection unit 18 detects that an abnormality has occurred in the pattern of the rope 21 on the basis of the norm of the similarity vector S4 (t, L1). For example, the abnormality detection unit 18 detects that an abnormality has occurred in the pattern of the rope 21 when the norm of the similarity vector S4 (t, L1) is outside of the normal range.

In the present embodiment, an example has been described in which light irradiated from the light source 4 strikes the rope 1 and the rope 21 at a same height. If the sensor head 2 is capable of acquiring pieces of surface data of different heights, even in the example described in the present embodiment, the controller 3 may further include the period calculation unit 13, the speed calculation unit 15, and the position calculation unit 16.

In such a case, for example, the sensor head 2 includes the light source 4, the light source 5, the light receiving element 6, and the light receiving element 7. The light source 4 irradiates the surface of the rope 1 with light. The light receiving element 6 receives light reflected by the surface of the rope 1 among the light irradiated from the light source 4. The light source 5 irradiates the surface of the rope 21 with light. The light irradiated from the light source 5 strikes the rope 21 at a position separated by a certain distance in the y axis direction from the position where the light from the light source 4 strikes the rope 1. The light receiving element 7 receives light reflected by the surface of the rope 21 among the light irradiated from the light source 5. The sensor head 2 may include the camera 20.

In addition, the speed calculation unit 15 calculates the movement speed of the rope 1 and the rope 21 on the basis of the phase θ (t, L1) and the phase θ (t, L2) calculated by the phase calculation unit 12. In this example, L2 denotes a height at which the light from the light source 5 strikes the rope 21. The position calculation unit 16 calculates a position of a detected abnormality on the rope 1 or on the rope 21 on the basis of a movement distance at the moment the abnormality is detected by the abnormality detection unit 14.

Any of the features disclosed in the first or second embodiment may be adopted as features not disclosed in the present embodiment.

Fourth Embodiment

An elevator to which the present detection device is applicable includes a governor for detecting a speed of a car. For example, the governor includes a governor rope, a governor sheave, and an encoder. The governor rope is wound around the governor sheave and moves in conjunction with the car of the elevator. In other words, when the car moves, the governor rope moves. In addition, when the governor rope moves, the governor sheave rotates. The encoder outputs a rotation signal in accordance with a direction of rotation and a rotational speed of the governor sheave. The rotation signal output from the encoder is used to control the car.

In the examples described in the first to third embodiments, the speed calculation unit 15 calculates a movement speed V of the rope 1. When a car of the elevator is suspended by the rope 1, the movement speed V of the rope 1 matches a movement speed of the car. Therefore, in the elevator, the speed of the car may be detected using the speed calculation unit 15 in place of the governor. In such a case, the elevator need not include the governor. Alternatively, in the elevator, the speed of the car may be detected using the speed calculation unit 15 together with the governor.

With a governor, a detection error may occur due to slippage that is generated between the governor rope and the governor sheave. With a governor, a detection error may occur due to abrasion of the governor sheave. Meanwhile, with the present detection device, acquisition of surface data can be realized in a contactless manner. Therefore, the speed of the car can be detected with accuracy. Furthermore, a configuration of the elevator can be simplified if there is no longer a need to provide a governor.

Figure 22:
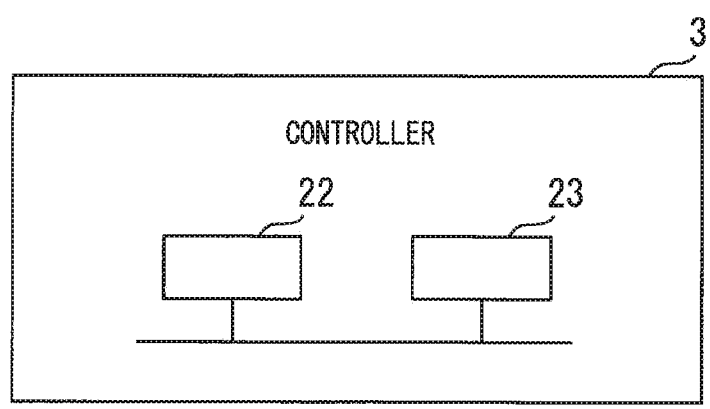
FIG. 22 is a diagram showing a hardware configuration of the controller.

Each of the units denoted by reference numerals 9 to 19 represents a function included in the controller 3. FIG. 22 is a diagram showing a hardware configuration of the controller 3. For example, as hardware resources, the controller 3 includes circuitry including a processor 22 and a memory 23. The function included in the storage unit 9 is realized by the memory 23. The controller 3 realizes the function of each of the units denoted by reference numerals 10 to 19 by causing the processor 22 to execute a program stored in the memory 23.

The processor 22 is also referred to as a CPU (Central Processing Unit), a central processor, a processing device, an arithmetic device, a microprocessor, a microcomputer, or a DSP. As the memory 23, a semiconductor memory, a magnetic disk, a flexible disk, an optical disk, a compact disc, a mini disc, or a DVD may be adopted. Adoptable semiconductor memories include a RAM, a ROM, a flash memory, an EPROM, and an EEPROM.

A part of or all of each of the functions included in the controller 3 may be realized by hardware. As the hardware for realizing the functions of the controller 3, a single circuit, a composite circuit, a programmed processor, a parallel-programmed processor, an ASIC, an FPGA, or a combination thereof may be adopted.

INDUSTRIAL APPLICABILITY

The detection device according to the present invention can be applied to a device for detecting a long body having a periodic pattern on a surface thereof.

REFERENCE SIGNS LIST 1 rope
2 sensor head
3 controller
4 light source
5 light source
6 light receiving element
7 light receiving element
8 signal line
9 storage unit
10 data processing unit
11 similarity calculation unit
12 phase calculation unit
13 period calculation unit
14 abnormality detection unit
15 speed calculation unit
16 position calculation unit
17 disabling unit
18 abnormality detection unit
19 selection unit
20 camera
21 rope
22 processor
23 memory

The invention claimed is:
1. A detection device, comprising:
a sensor head to acquire first surface data and second surface data of a long body having a periodic pattern on a surface thereof, the sensor head configured to acquire, at different positions in a longitudinal direction of the long body, the first surface data and the second surface data in a direction orthogonal to the longitudinal direction of the long body; and
circuitry configured to
store first reference data and second reference data, the first reference data and the second reference data having a same period as a period of the pattern formed on the surface of the long body in a direction orthogonal to the longitudinal direction of the long body, the second reference data having a phase shifted from a phase of the first reference data;
calculate a first similarity between the first surface data acquired by the sensor head and the first reference data, a second similarity between the first surface data acquired by the sensor head and the second reference data, a third similarity between the second surface data acquired by the sensor head and the first reference data, and a fourth similarity between the second surface data acquired by the sensor head and the second reference data;
calculate, as a first phase, a deflection angle of a first similarity vector having the calculated first similarity and the calculated second similarity as elements and, as a second phase, a deflection angle of a second similarity vector having the calculated third similarity and the calculated fourth similarity as elements;
calculate a period of the pattern formed on the long body on the basis of the calculated first phase and the calculated second phase; and
detect an abnormality in the long body on the basis of the calculated period.
2. The detection device according to claim 1, wherein the circuitry is further configured to:
calculate a speed of the long body on the basis of the calculated first phase and the calculated second phase; and
calculate, on the basis of the calculated speed, a position on the long body of the detected abnormality.
3. The detection device according to claim 1, wherein the circuitry is further configured to detect that an abnormality has occurred in the pattern of the long body on the basis of at least one of a norm of the first similarity vector having the calculated first similarity and the calculated second similarity as elements and a norm of the second similarity vector having the calculated third similarity and the calculated fourth similarity as elements.
4. The detection device according to claim 1, wherein the sensor head includes:
a first light source configured to irradiate the long body with light;
a second light source configured to irradiate the long body with light of a wavelength that differs from a wavelength of the light from the first light source; and
a light receiving element configured to receive light from the first light source having been reflected by the long body and light from the second light source having been reflected by the long body.

5. The detection device according to claim 1, wherein the circuitry is further configured to disable abnormality detection on the basis of at least one of a norm of the first similarity vector having the calculated first similarity and the calculated second similarity as elements and a norm of the second similarity vector having the calculated third similarity and the calculated fourth similarity as elements.

6. The detection device according to claim 1, wherein the sensor head includes a camera.

7. A detection device, comprising:
a sensor head to acquire a plurality of pieces of surface data of a long body having a periodic pattern on a surface thereof, the sensor head configured to acquire, at different positions in a longitudinal direction of the long body, the plurality of pieces of surface data in a direction orthogonal to the longitudinal direction of the long body; and
circuitry configured to
store first reference data and second reference data, the first reference data and the second reference data having a same period as a period of the pattern formed on the surface of the long body in a direction orthogonal to the longitudinal direction of the long body, the second reference data having a phase shifted from a phase of the first reference data;
select first surface data and second surface data from the pieces of surface data acquired by the sensor head;
calculate a first similarity between the selected first surface data and the first reference data, a second similarity between the selected first surface data and the second reference data, a third similarity between the selected second surface data and the first reference data, and a fourth similarity between the selected second surface data and the second reference data;
calculate, as a first phase, a deflection angle of a first similarity vector having the calculated first similarity and the calculated second similarity as elements and, as a second phase, a deflection angle of a second similarity vector having the calculated third similarity and the calculated fourth similarity as elements;
calculate a period of the pattern formed on the long body on the basis of the calculated first phase and the calculated second phase; and
detect an abnormality in the long body on the basis of the calculated period.

8. The detection device according to claim 7, wherein the circuitry is further configured to select, as the first surface data and the second surface data, surface data with a largest norm and surface data with a second largest norm of a similarity vector having a similarity with the first reference data and a similarity with the second reference data as elements among the pieces of surface data acquired by the sensor head.

9. The detection device according to claim 7, wherein the circuitry is further configured to select, as the first surface data and the second surface data, two pieces of surface data which maximizes an angle formed between similarity vectors from pieces of surface data of which a norm of a similarity vector having a similarity with the first reference data and a similarity with the second reference data as elements is equal to or larger than a reference value among the pieces of surface data acquired by the sensor head.

10. The detection device according to claim 7, wherein the circuitry is further configured to:
calculate a speed of the long body on the basis of the calculated first phase and the calculated second phase; and
calculate, on the basis of the calculated speed, a position on the long body of the detected abnormality.

11. The detection device according to claim 7, wherein the circuitry is further configured to detect that an abnormality has occurred in the pattern of the long body on the basis of at least one of a norm of the first similarity vector having the calculated first similarity and the calculated second similarity as elements and a norm of the second similarity vector having the calculated third similarity and the calculated fourth similarity as elements.

12. The detection device according to claim 7, wherein the sensor head includes:
a first light source configured to irradiate the long body with light;
a second light source configured to irradiate the long body with light of a wavelength that differs from a wavelength of the light from the first light source; and
a light receiving element configured to receive light from the first light source having been reflected by the long body and light from the second light source having been reflected by the long body.

13. The detection device according to claim 7, wherein the circuitry is further configured to disable abnormality detection on the basis of at least one of a norm of the first similarity vector having the calculated first similarity and the calculated second similarity as elements and a norm of the second similarity vector having the calculated third similarity and the calculated fourth similarity as elements.

14. The detection device according to claim 7, wherein the sensor head includes a camera.

15. A detection device, comprising:
a sensor head to acquire first surface data of a first long body having a periodic pattern on a surface thereof and second surface data of a second long body having, on a surface thereof, a same pattern as the pattern formed on the surface of the first long body, the sensor head configured to acquire the first surface data in a direction orthogonal to a longitudinal direction of the first long body and to acquire the second surface data in a direction orthogonal to a longitudinal direction of the second long body; and
circuitry configured to
to store first reference data and second reference data, the first reference data and the second reference data having a same period as a period of the pattern formed on the surface of the first long body in a direction orthogonal to the longitudinal direction of the first long body, the second reference data having a phase shifted from a phase of the first reference data;
calculate a first similarity between the first surface data acquired by the sensor head and the first reference data, a second similarity between the first surface data acquired by the sensor head and the second reference data, a third similarity between the second surface data acquired by the sensor head and the first reference data, and a fourth similarity between the second surface data acquired by the sensor head and the second reference data;
calculate, as a first phase, a deflection angle of a first similarity vector having the calculated first similarity and the calculated second similarity as elements and, as a second phase, a deflection angle of a second similarity vector having the calculated third similarity and the calculated fourth similarity as elements; and
detect that an abnormality has occurred in the first long body or the second long body on the basis of the calculated first phase and the calculated second phase.

16. The detection device according to claim 15, wherein the circuitry is further configured to detect that an abnormality has occurred in the pattern of the first long body on the basis of a norm of the first similarity vector having the calculated first similarity and the calculated second similarity as elements, and detect that an abnormality has occurred in the pattern of the second long body on the basis of a norm of the second similarity vector having the calculated third similarity and the calculated fourth similarity as elements.

17. The detection device according to claim 15, wherein the sensor head includes:
   a light source configured to irradiate the first long body and the second long body with light; and
   a light receiving element configured to receive light from the light source having been reflected by the first long body and light from the light source having been reflected by the second long body.

18. The detection device according to claim 15, wherein the circuitry is further configured to disable abnormality detection on the basis of at least one of a norm of the first similarity vector having the calculated first similarity and the calculated second similarity as elements and a norm of the second similarity vector having the calculated third similarity and the calculated fourth similarity as elements.

19. The detection device according to claim 15, wherein the sensor head includes a camera.

* * * * *